(12) United States Patent
Ohkubo

(10) Patent No.: US 7,729,513 B2
(45) Date of Patent: Jun. 1, 2010

(54) CONTACT TIME CALCULATION APPARATUS, OBSTACLE DETECTION APPARATUS, CONTACT TIME CALCULATION METHOD, AND OBSTACLE DETECTION METHOD

(75) Inventor: Naoko Ohkubo, Machida (JP)

(73) Assignee: Nissan Motor Co., Ltd., Kanagawa (JP)

( * ) Notice: Subject to any disclaimer, the term of this patent is extended or adjusted under 35 U.S.C. 154(b) by 1298 days.

(21) Appl. No.: 11/203,996

(22) Filed: Aug. 16, 2005

(65) Prior Publication Data

US 2006/0008120 A1   Jan. 12, 2006

(30) Foreign Application Priority Data

Sep. 7, 2004   (JP)   .............. 2004-259893
Feb. 1, 2005   (JP)   .............. 2005-025312

(51) Int. Cl.
G06K 9/00   (2006.01)
(52) U.S. Cl. .................................... 382/104
(58) Field of Classification Search ................ 382/100, 382/103, 104, 106, 107; 701/45, 23, 28, 701/29, 25, 26, 96, 301; 340/425.5, 435, 340/436, 438, 937, 540, 576, 901; 348/135, 348/136

See application file for complete search history.

(56) References Cited

U.S. PATENT DOCUMENTS

| | | | | |
|---|---|---|---|---|
| 6,049,747 | A * | 4/2000 | Nakajima et al. | ............ 701/45 |
| 6,246,961 | B1 * | 6/2001 | Sasaki et al. | ............ 701/301 |
| 6,794,987 | B2 * | 9/2004 | Schiffmann et al. | ......... 340/435 |
| 2003/0015864 | A1 * | 1/2003 | Midorikawa et al. | ........ 280/807 |
| 2003/0016845 | A1 | 1/2003 | Farmer | |
| 2003/0033066 | A1 * | 2/2003 | Farmer | ....................... 701/45 |
| 2004/0124625 | A1 * | 7/2004 | Bae | ........................... 280/807 |
| 2004/0189512 | A1 * | 9/2004 | Takashima et al. | ........... 342/70 |

FOREIGN PATENT DOCUMENTS

| | | |
|---|---|---|
| JP | 02-218284 | 8/1990 |
| JP | 07-047915 | 2/1995 |
| JP | 11-353565 A | 12/1999 |
| JP | 2001-101592 | 4/2001 |
| JP | 2003-160021 | 6/2003 |
| JP | 2003-175797 | 6/2003 |

OTHER PUBLICATIONS

Japanese Notification of Reasons for Refusal, w/English translation thereof, issued in Japanese Patent Application No. JP 2005-025312 dated Dec. 8, 2009.

* cited by examiner

Primary Examiner—Samir A Ahmed
Assistant Examiner—Atiba O Fitzpatrick
(74) Attorney, Agent, or Firm—McDermott Will & Emery LLP

(57) ABSTRACT

Two arbitrary points belonging to a single object in an image captured by an camera installed in a vehicle body are extracted as evaluation points, the absolute value representing the difference between the coordinate values of the extracted two points, which are taken in reference to an arbitrary coordinate axis set on the image, is calculated and a time differential value of the absolute value representing the difference between the coordinate values of the two points is determined. Based upon the absolute value representing the difference between the coordinate values and the time differential value, the length of time to elapse before the object containing the two extracted points contacts the vehicle body is calculated.

23 Claims, 18 Drawing Sheets

TIME t + Δt

TIME t

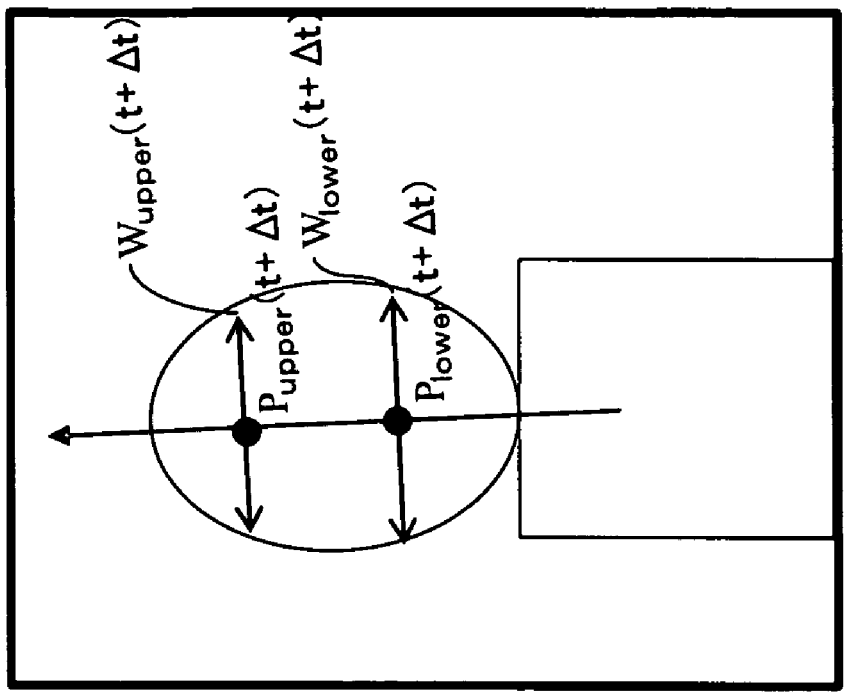
FIG.19B TIME t + Δt
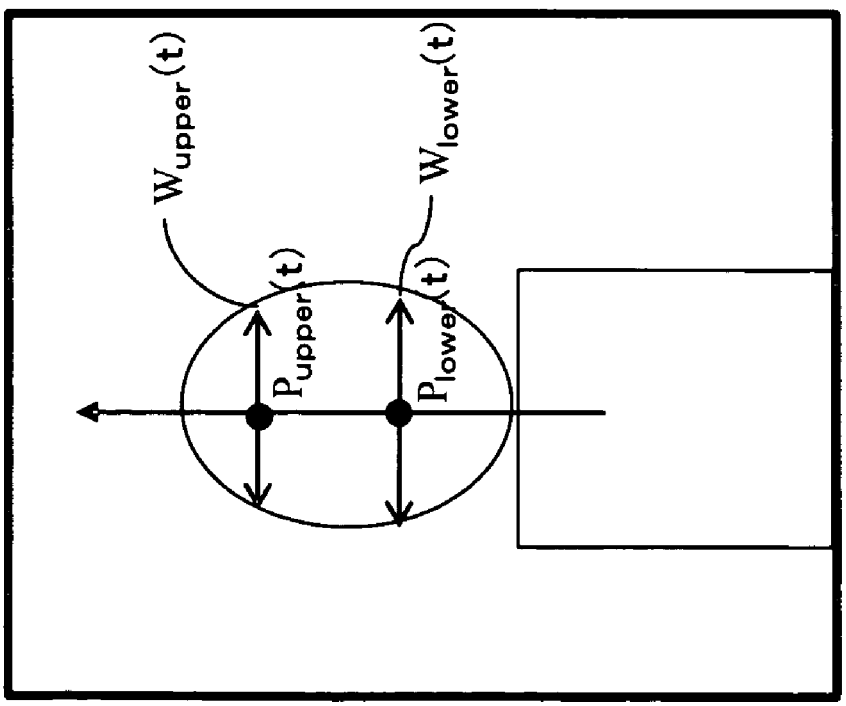
FIG.19A TIME t

US 7,729,513 B2

CONTACT TIME CALCULATION APPARATUS, OBSTACLE DETECTION APPARATUS, CONTACT TIME CALCULATION METHOD, AND OBSTACLE DETECTION METHOD

BACKGROUND OF THE INVENTION

1. Field of the Invention

The present invention relates to a contact time calculation apparatus that calculates the length of time to elapse before an obstacle in an image captured with a camera contacts a body moving relative to itself, an obstacle detection apparatus that detects the obstacle based upon the length of time to elapse before the contact, which has been calculated by the contact time calculation apparatus, a contact time calculation method and an obstacle detection method.

2. Description of Related Art

There is a technology known in the related art through which the length of time to elapse before the obstacle detected based upon an image photographed with an on-vehicle camera comes into contact with the subject vehicle is calculated (see Japanese Laid Open Patent Publication No. H11-353565). In the technology in the related art, the contact time is calculated by setting a coordinate system, the origin point of which is a vanishing point on the image and determining the optical flow of a specific characteristic point in the coordinate system having been set.

SUMMARY OF THE INVENTION

However, since the vanishing point is caused to move by the vehicular behavior such as pitching and yawing, there is a problem with the related art in that an error is bound to occur with regard to the contact time.

It would be desirable to provide a contact time calculation apparatus that includes an image-capturing device installed at a mobile body, an evaluation point extraction device that extracts as evaluation points two arbitrary points belonging to a single object on an image captured by the image-capturing device, a first calculation device that calculates an absolute value representing a difference between coordinate values of the two points having been extracted by the evaluation point extraction device, which are taken in reference to an arbitrary coordinate axis set on the image, a second calculation device that calculates a time differential value of the absolute value representing the difference between the coordinate values of the two points calculated by the first calculation device, based upon at least two images captured by the image-capturing device, and a calculation device that calculates a length of time to elapse before the object containing the two points extracted by the evaluation point extraction device contacts the mobile body based upon the absolute value representing the difference between the coordinate values of the two points calculated by the first calculation device and the time differential value of the absolute value representing the difference between the coordinate values of the two points, which is calculated by the second calculation device.

It would be desirable to provide an obstacle detection apparatus that includes the contact time calculation apparatus and an obstacle detection device that detects an obstacle based upon the contact time having been calculated by the contact time calculation apparatus.

It would be desirable to provide a contact time calculation method that includes steps of extracting as evaluation points two arbitrary points belonging to a single object on an image captured by the image-capturing device installed at a mobile body, calculating an absolute value representing a difference between coordinate values of the two points having been extracted which are taken in reference to an arbitrary coordinate axis set on the image, calculating a time differential value of the absolute value representing the difference between the coordinate values of the two points based upon at least two images captured by the image-capturing device, and calculating a length of time to elapse before the object containing the two points contacts the mobile body based upon the absolute value representing the difference between the coordinate values of the two points and the time differential value of the absolute value representing the difference between the coordinate values of the two points.

It would be desirable to provide an obstacle detection method that includes steps of extracting as evaluation points two arbitrary points belonging to a single object on an image captured by the image-capturing device installed at a mobile body, calculating an absolute value representing a difference between coordinate values of the two points having been extracted which are taken in reference to an arbitrary coordinate axis set on the image, calculating a time differential value of the absolute value representing the difference between the coordinate values of the two points based upon at least two images captured by the image-capturing device, calculating a length of time to elapse before the object containing the two points contacts the mobile body based upon the absolute value representing the difference between the coordinate values of the two points and the time differential value of the absolute value representing the difference between the coordinate values of the two points, and detecting an obstacle based upon the contact time having been calculated.

BRIEF DESCRIPTION OF THE DRAWINGS

FIG. 5 shows obstacles that the subject vehicle may collide with;

FIG. 6 shows obstacles that the subject vehicle may collide with and an obstacle that the subject vehicle has no likelihood of colliding with;

FIGS. 19A and 19B show two reference points set on the principal axis extending through a face area, with FIG. 19A showing an image captured at a time point t and FIG. 19B showing an image captured at a time point t+Δt;

DETAILED DESCRIPTION OF PREFERRED EMBODIMENTS

FIRST EMBODIMENT

Figure 1:
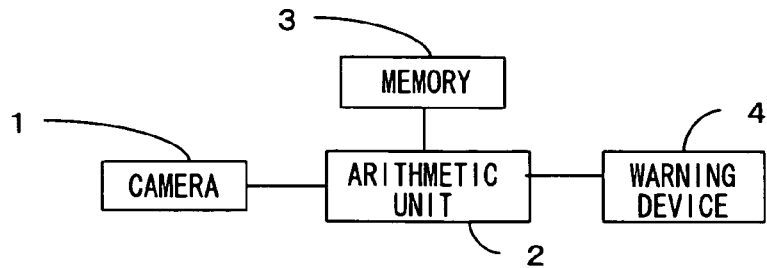
FIG. 1 shows the structure adopted in the contact time calculation apparatus in a first embodiment.

FIG. 1 shows the structure adopted in the contact time calculation apparatus in the first embodiment. The contact time calculation apparatus in the first embodiment, which is installed and operated in a vehicle, includes a camera 1, an arithmetic unit 2, a memory 3 and a warning device 4.

The camera 1, which may be a video camera, is installed at the center of the ceiling on the front side inside the vehicle to capture an image ahead of the vehicle. The image captured by the camera 1 is input to the arithmetic unit 2. The arithmetic unit 2 calculates the length of time to elapse before an object present in the image comes into contact with the subject vehicle based upon the image captured by the camera 1. The warning device 4 outputs a warning for the driver based upon the contact time calculated by the arithmetic unit 2.

Figure 2:
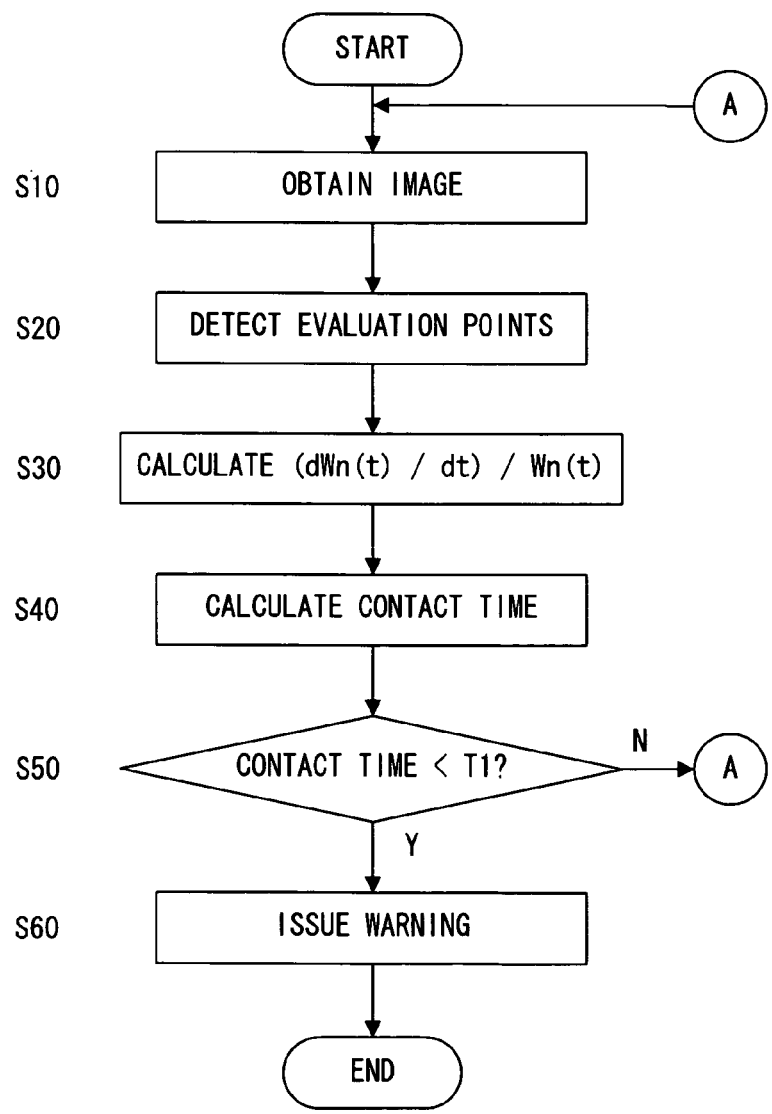
FIG. 2 presents a flowchart of the processing executed by the contact time calculation apparatus in the first embodiment.

FIG. 2 presents a flowchart of the processing executed by the contact time calculation apparatus in the first embodiment. As a key switch (not shown) is turned on in the vehicle, the arithmetic unit 2 starts the processing in step S10. In step S10, the image captured by the camera 1 is obtained and then the operation proceeds to step S20.

Figure 3B:
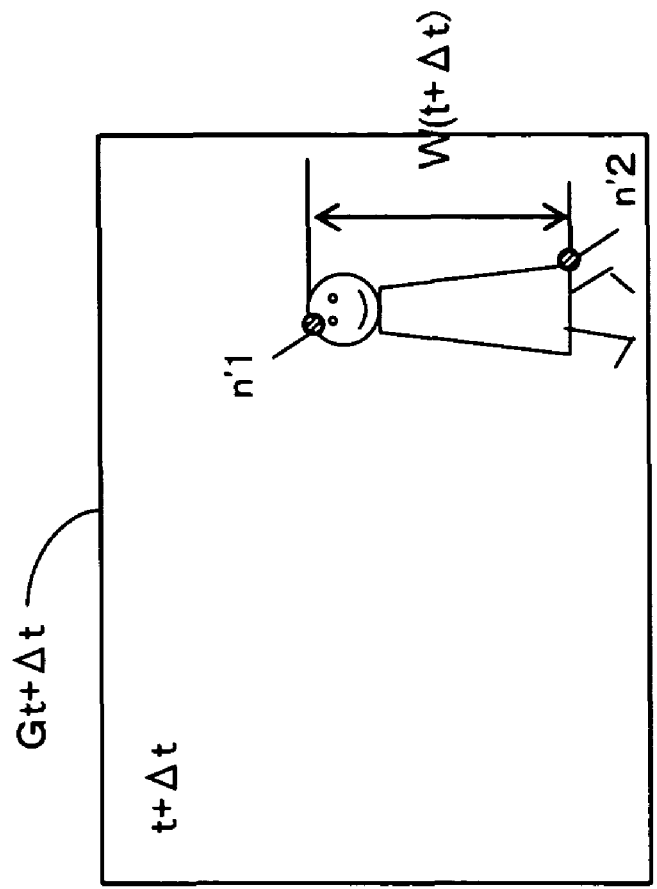
FIG. 3A shows an image captured at a time point t and FIG. 3B shows an image captured at a time point t+Δt.
Figure 3A:
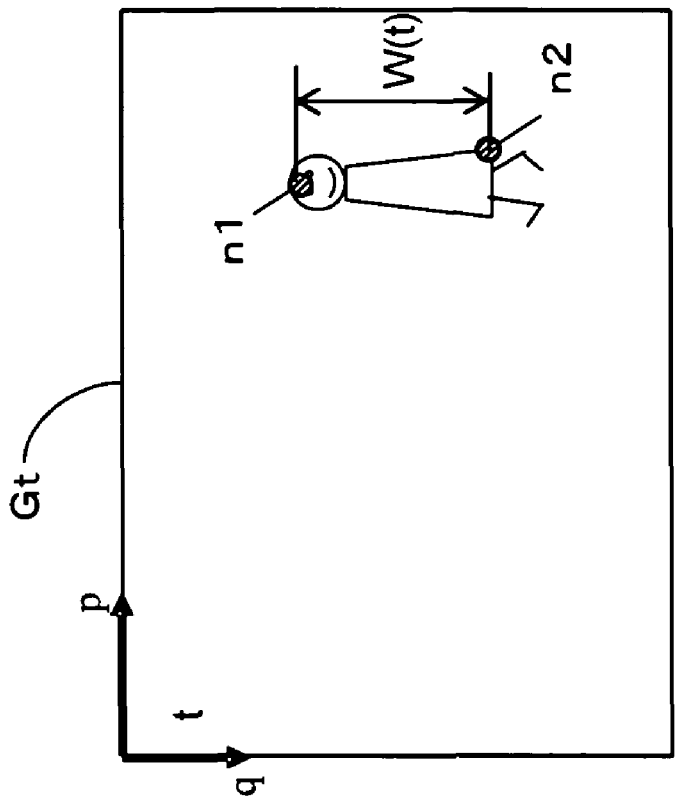

In step S20, the coordinate values of two arbitrary points belonging to a single object are determined based upon the image having been obtained in step S10. FIGS. 3A and 3B present an example of images captured with the camera 1, with the FIG. 3A showing an image Gt captured at a time point t and FIG. 3B showing an image Gt+Δt captured at a time point t+Δt. The arithmetic unit 2 first detects two arbitrary points belonging to the single object present on the image. Any method in the known art may be adopted to detect the two points belonging to the single object in the image. The two points thus detected are used as evaluation points when determining a contact time Tttc to be detailed later.

Next, the arithmetic unit 2 determines the coordinate values of the two points having been detected. In this example, the axis extending along the horizontal direction and the axis extending along the vertical direction in the image are respectively designated as a p axis and a q axis and the coordinates of the two arbitrary points n1 and n2 are indicated as (pn1, qn1) and (pn2, qn2) respectively, as shown in FIG. 3A. Once the coordinate values of the two points belonging to the single object are determined, the operation proceeds to step S30.

In step S30, the distance Wn (=|qn1−qn2|) between the two points having been detected in step S20 along the q axis is first calculated and then (dWn (t)/dt)/Wn(t) is calculated through an arithmetic operation. In this step, the differential value dWn(t)/dt can be calculated by using the image Gt captured at the time point t and the image Gt+Δt captured at the time point t+Δt. For instance, dWn(t)/dt may be calculated as expressed in (1) below by detecting points n1' and n2' in the image Gt+Δt in FIG. 3B respectively corresponding to the evaluation points n1 and n2 in the image Gt and then by determining the distance Wn(t+Δt) between the two points n1' and n2' along the q axis.

$$dWn(t)/dt=\{Wn(t+\Delta t)-Wn(t)\}/\Delta t (\Delta t->0) \quad (1)$$

In step S40, which follows step S30, the reciprocal of (dWn(t)/dt)/Wn(t) having been calculated in step S30 is calculated as the contact time Tttcn(t) (see expression (2) below).

$$Tttcn(t)=Wn(t)/(dWn(t)/dt) \quad (2)$$

Figure 4:
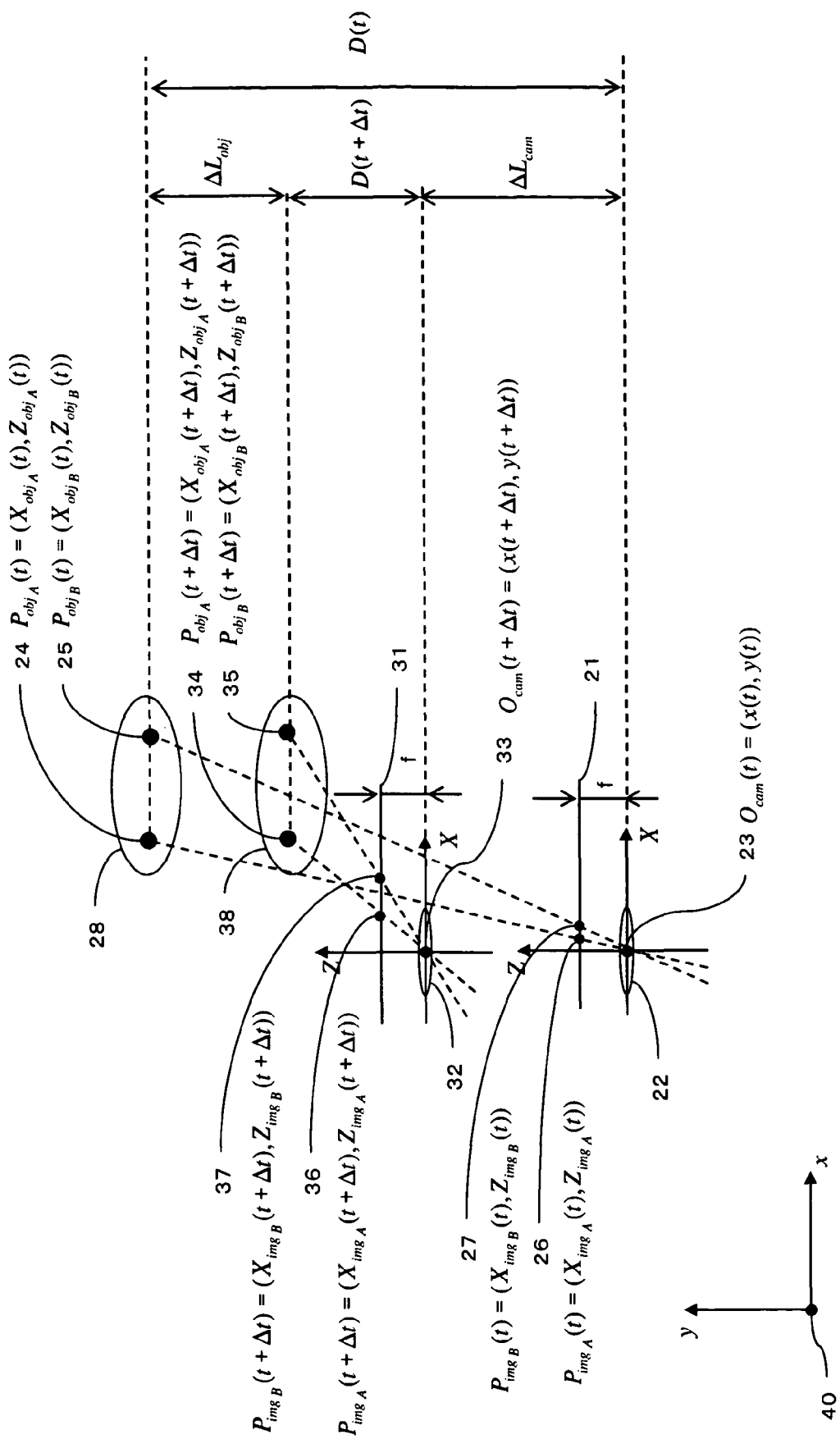
FIG. 4 shows the positions of the camera and an obstacle at the time point t and the positions of the camera and the obstacle at the time point t+Δt.

Now, how the length of time Tttcn(t) to elapse before the obstacle comes into contact with the vehicle is calculated as expressed in (2) is explained in reference to FIG. 4. Reference numeral 21 in FIG. 4 indicates the position of the image-capturing plane of the camera 1 at a given time point t. FIG. 4 shows the image-capturing plane assuming the position determined by reversing the actual image-capturing plane position relative to a lens 22 along the visual line to simplify the illustration. Reference numeral 22 indicates the position of the lens in the camera 1 at the time point t. f indicates the distance between the image-capturing plane 21 and the lens 22, i.e., the focal length of the camera 1.

Reference numeral 23 indicates a polar coordinate system taken at the time point t by setting the origin point thereof at the center of the lens 22, which is referred to as a camera coordinate system in this document. The origin point of the camera coordinate system 23 is present at a position indicated with coordinate values Ocam(t)=(x(t), y(t)) in a global coordinate system 40. The Z axis of the camera coordinate system 23 is a straight line connecting a vanishing point on the image-capturing plane 21 with the center of the lens 22, whereas the X axis of the camera coordinate system 23 extends perpendicular to the Z axis. It is to be noted that the global coordinate system 40 is an x-y coordinate system with the origin point thereof set at an arbitrary position, with the x axis extending parallel to the X axis of the camera coordinate system 23 and the y axis extending parallel to the Z axis of the camera coordinate system 23.

Reference numeral 28 indicates the position at which a given obstacle is located at the time point t. Two points 24 and 25 contained in the obstacle are evaluation points. Reference numeral 24 indicates the position of an image-capturing object point A contained in the obstacle 28 at the time point t. The coordinate values of the image-capturing object point A in the camera coordinate system 23 are indicated as $Pobj_A(t) = (Xobj_A(t), Zobj_A(t))$. Reference numeral 25 indicates the position of an image-capturing object point B contained in the obstacle 28 at the time point t. The coordinate values of the image-capturing object point B in the camera coordinate system 23 are indicated as $Pobj_B(t)=(Xobj_B(t), Zobj_B(t))$.

Reference numeral 26 indicates the position at which an image of the image-capturing object point A located at the position 24 is formed on the image-capturing plane 21. The coordinate values of the position at which the image of the image-capturing object point A is formed in the camera coordinate system 23 are indicated as $Pimg_A(t)=(Ximg_A(t), Zimg_A(t))$. It is to be noted that $Zimg_A(t)=f$. Reference numeral 27 indicates the position at which an image of the image-capturing object point B located at the position 25 is formed on the image-capturing plane 21. The coordinate values of the position at which the image of the image-capturing object point B is formed in the camera coordinate system 23 are indicated as $Pimg_B(t)=(Ximg_B(t), Zimg_B(t))$. It is to be noted that $Zimg_B(t)=f$.

Reference numeral 31 indicates the position of the image-capturing plane of the camera 1 at a given time point $t+\Delta t$. The figure shows the image-capturing plane assuming the position determined by reversing the actual image-capturing plane position relative to the lens 22 along the visual line to simplify the illustration. Reference numeral 32 indicates the position of the lens in the camera 1 at the time point $t+\Delta t$. Reference numeral 33 indicates a polar coordinate system taken at the time point $t+\Delta t$ by setting the origin point thereof at the center of the lens 32, which is a translation of the camera coordinate system 23 at the time point t. The origin point of the camera coordinate system 33 is present at a position indicated with coordinate values $Ocam(t+\Delta t)=(x(t+\Delta t), y(t+\Delta t))$ in the polar coordinate system 40.

Reference numeral 38 indicates the position of the obstacle at the time point $t+\Delta t$ that was at the position 28 at the time point t. Reference numeral 34 indicates the position of the image-capturing object point A at the time point $t+\Delta t$, translated from the position of the image-capturing object point A at the time point t. The coordinate values of the image-capturing object point A at the time point $t+\Delta t$ in the camera coordinate system 33 are indicated as $Pobj_A(t+\Delta t)=(Xobj_A(t+\Delta t), Zobj_A(t+\Delta t))$. Reference numeral 35 indicates the position of the image-capturing object point B at the time point $t+\Delta t$, translated from the position of the image-capturing object point B at the time point t. The coordinate values of the image-capturing object point B at the time point $t+\Delta t$ in the camera coordinate system 33 are indicated as $Pobj_B(t+\Delta t)=(Xobj_B(t+\Delta t), Zobj_B(t+\Delta t))$.

Reference numeral 36 indicates the position at which an image of the image-capturing object point A located at the position 34 is formed on the image-capturing plane 31 at the time point $t+\Delta t$. The coordinate values of the position at which the image of the image-capturing object point A is formed in the camera coordinate system 33 at the time point $t+\Delta t$ are indicated as $Pimg_A(t+\Delta t)=(Ximg_A(t+\Delta t), Zimg_A(t+\Delta t))$. It is to be noted that $Zimg_A(t+\Delta t)=f$. Reference numeral 37 indicates the position at which an image of the image-capturing object point B located at the position 35 is formed on the image-capturing plane 31 at the time point $t+\Delta t$. The coordinate values of the position at which the image of the image-capturing object point B is formed in the camera coordinate system 33 at the time point $t+\Delta t$ are indicated as $Pimg_B(t+\Delta t)=(Ximg_B(t+\Delta t), Zimg_B(t+\Delta t))$. It is to be noted that $Zimg_B(t+\Delta t)=f$.

Since the relationship expressed as $Zimg_A(t)=Zimg_B(t)=f$ is true, relationships expressed in (3) and (4) below are also true respectively with regard to the image-capturing object point A and the image-capturing object point B at the time point t.

$$Xobj_A(t)/Zobj_A(t)=Ximg_A(t)/f \quad (3)$$

$$Xobj_B(t)/Zobj_B(t)=Ximg_B(t)/f \quad (4)$$

With Wobj(t) representing the difference between the coordinate values of the image-capturing object points A and B taken along the x axis in actual space (in the global coordinate system) at the time point t and Wimg(t) representing the difference between the coordinate values along the x axis on the image-capturing plane 21, the following expression (6) is deduced based upon expressions (3) and (4). It is to be noted that since the image-capturing object points A and B are present over distances equal to each other from the lens 22 along the Z axis in the camera coordinate system 23 (see FIG. 4), it is assumed that;

$$D(t)=Zobj_A(t)=Zobj_B(t) \quad (5)$$

$$Wobj(t)=Wimg(t) \times D(t)/f \quad (6), when$$

$$Wobj(t)=|Xobj_B(t)-Xobj_A(t)| \quad (7), and$$

$$Wimg(t)=|Ximg_B(t)-Ximg_A(t)| \quad (8)$$

A relationship expressed in (9), similar to expression (6) is true at the time point $t+\Delta t$.

$$Wobj(t+\Delta t)=Wimg(t+\Delta t) \times D(t+\Delta t)/f \quad (9), when$$

$$Wobj(t+\Delta t)=|Xobj_B(t+\Delta t)-Xobj_A(t+\Delta t)| \quad (10)$$

$$Wimg(t+\Delta t)=|Ximg_B(t+\Delta t)-Ximg_A(t+\Delta t)| \quad (11), and$$

$$D(t+\Delta t)=Zobj_A(t+\Delta t)=Zobj_B(t+\Delta t) \quad (12)$$

Since the image-capturing object points A and B are present on a single object and the positional relationship between the two points in actual space remains unchanged, a relationship expressed in (13) is true.

$$Wobj(t+\Delta t)=Wobj(t) \quad (13)$$

The following expression (14) is deduced based upon expressions (6), (9) and (13).

$$D(t+\Delta t)/\{(D(t+\Delta t)-D(t))/\Delta t\}=Wimg(t)/\{(Wimg(t+\Delta t)-Wimg(t))/\Delta t\} \quad (14)$$

As shown in FIG. 4, with $\Delta Lcam$ representing the distance over which the image-capturing plane moves during the time period $\Delta t$ in actual space and $\Delta Lobj$ representing the distance over which the object moves in actual space during the time period $\Delta t$, a relationship expressed in (15) below is true.

$$D(t+\Delta t)-D(t)=\Delta Lcam+\Delta Lobj \quad (15)$$

Namely, the denominator in the left side member in expression (14) indicates a displacement per unit time occurring in the relative distance between the image-capturing plane and the object along the z axis. By assuming that $\Delta t \rightarrow 0$ in expression (14), the following expression (16) is obtained.

$$D(t)/(dD(t)/dt)=Wimg(t)/dwimg(t)/d(t) \quad (16)$$

The denominator in the left side member in expression (16) indicates the relative speed between the image-capturing plane and the object. Accordingly, the left side member in expression (16), in which the distance D(t) between the image-capturing plane and the object is divided by the relative speed, indicates the length of time to elapse before the distance between the object and the image-capturing surface becomes zero. Namely, the contact time Tttc(t) corresponding to the time point t, which is to elapse before the image-capturing plane and the object contact each other is expressed as in (17) below.

$$Tttc(t)=Wimg(t)/(dWimg(t)/dt) \quad (17)$$

It is to be noted that if the relationships expressed in (5) and (12) do not exist, i.e., if the point A and the point B are present over different distances from the image-capturing plane of the camera 1, the value calculated as expressed in (17) indicates the contact time to elapse before a middle point between the point A and the point B reaches the image-capturing plane. Namely, D(t) in expression (16) can be expressed as in (18) below.

$$D(t)=(Zobj_A(t)+Zobj_B(t))/2 \quad (18)$$

As described above, the length of time Tttc(t) to elapse before the distance between object and the image-capturing plane of the camera 1, i.e., the subject vehicle, becomes zero, can be determined by using expression (17). Once the contact time Tttc(t) is determined in step S40 in the flowchart presented in FIG. 2, the operation proceeds to step S50. In step S50, a decision is made as to whether or not the contact time Tttc(t) having been calculated in step S40 is smaller than a predetermined threshold value T1. If it is decided that Tttc(t) <T1 is true, the operation proceeds to step S60. In step S60, the arithmetic unit 2 issues a warning command for the warning device 4. Upon receiving the warning command, the warning device 4 outputs a warning for the driver.

If, on the other hand, it is decided in step S50 that the contact time Tttc(t) is equal to or greater than the predetermined threshold value T1, a warning for the driver is judged to be unnecessary and in such a case, the operation returns to step S10 to execute processing for calculating a contact time Tttc(t) in correspondence to another object present on the captured image.

The contact time calculation apparatus in the first embodiment detects two arbitrary points belonging to a single object present on an image captured by the camera 1, calculates the absolute value Wimg(t) of the difference between the coordinate values of the two detected points, calculates the time differential value (dWimg(t)/dt) of Wimg(t) and calculates the length of time to elapse before the object containing the two points used in the arithmetic operation comes into contact with the vehicle (before the object reaches the image-capturing plane of the camera 1) by dividing Wimg(t) by (dwimg(t)/dt). As a result, the length of time to elapse before the object reaches the vehicle can be calculated accurately. Namely, while the method for calculating the contact time by using a coordinate system the origin point of which is set at a vanishing point is problematic in that the contact time cannot be calculated with accuracy if certain vehicular behavior causes an erroneous detection of the position of the vanishing point, the contact time calculation apparatus in the embodiment calculates the contact time without having to determine a vanishing point on the image and is thus capable of accurate contact time calculation.

In addition, the contact time calculation apparatus in the embodiment detects two arbitrary points belonging to a single object in the image as evaluation points and calculates the contact time based upon the positional relationship between the two points. As a result, the contact time can be calculated accurately regardless of the position in the image-capturing plane assumed by the object. Furthermore, the contact time calculation apparatus in the first embodiment is capable of accurately calculating the contact time even when the object is moving along a direction that intersects the advancing direction of the subject vehicle, i.e., even when the object is traveling on a vector extending along the direction that intersects the vanishing point in the image.

Furthermore, since the accurate contact time can be calculated, a warning for the driver can be issued by detecting a risk obstacle that may collide with the subject vehicle based upon the calculated contact time.

SECOND EMBODIMENT

Figure 5:
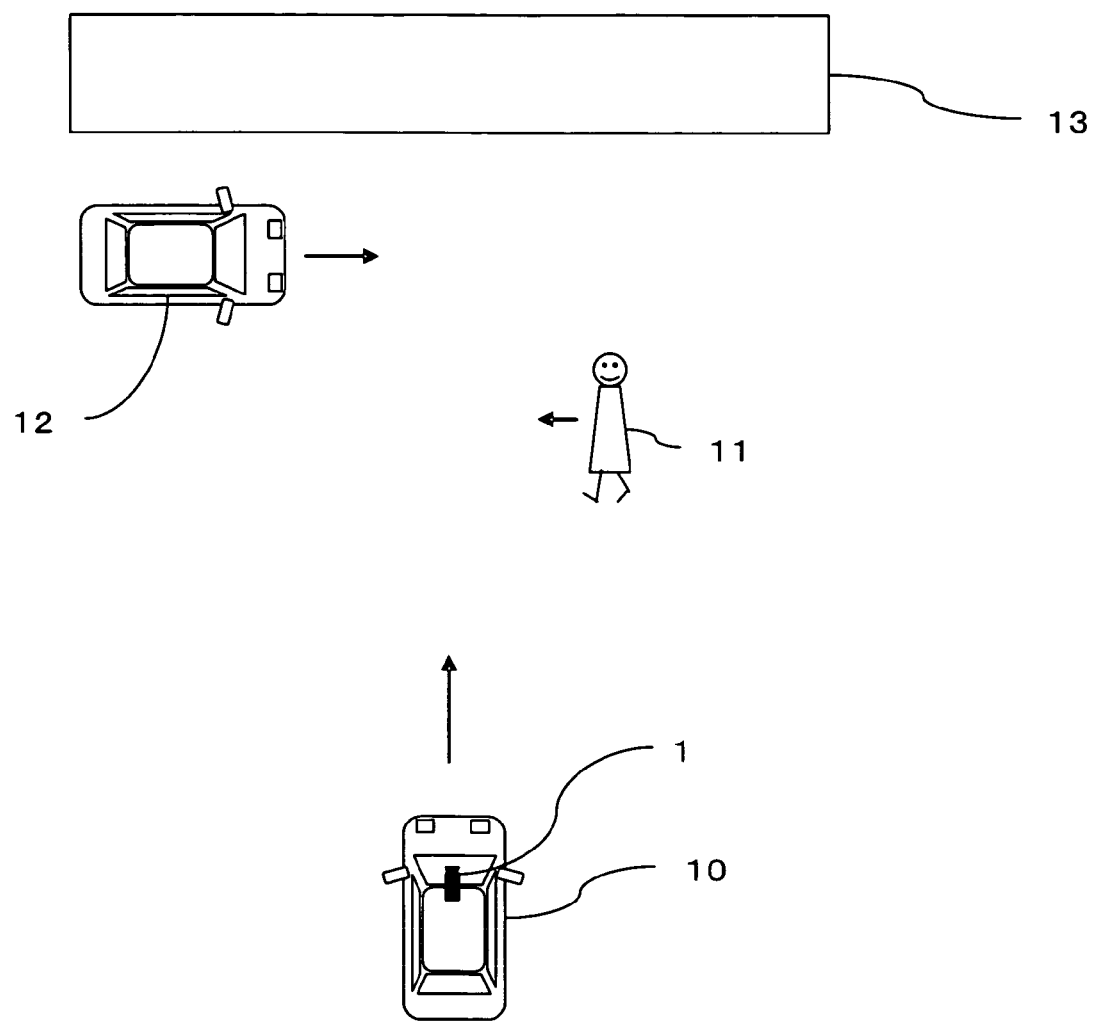

The contact time calculation apparatus in the first embodiment calculates the time length Tttc (t) to elapse before the object in the image captured by the camera 1 comes into contact with the subject vehicle and issues a warning for the driver based upon the calculated contact time Tttc(t). When, for instance, a pedestrian 11 and another vehicle 12 are to cross the road ahead of the vehicle 10 having the camera 1 installed therein and a building 13 is present ahead of the subject vehicle 10, as shown in FIG. 5, the risk of the vehicle 10 colliding with these obstacles 11 through 13 does exist and accordingly, a warning should be issued for the driver. However, the contact time calculation apparatus in the first embodiment is not capable of judging whether an object in the captured image is a risk object that may actually contact the subject vehicle or the object that is merely to pass by the subject vehicle without coming into contact. This point is explained in reference to FIG. 6.

Figure 6:
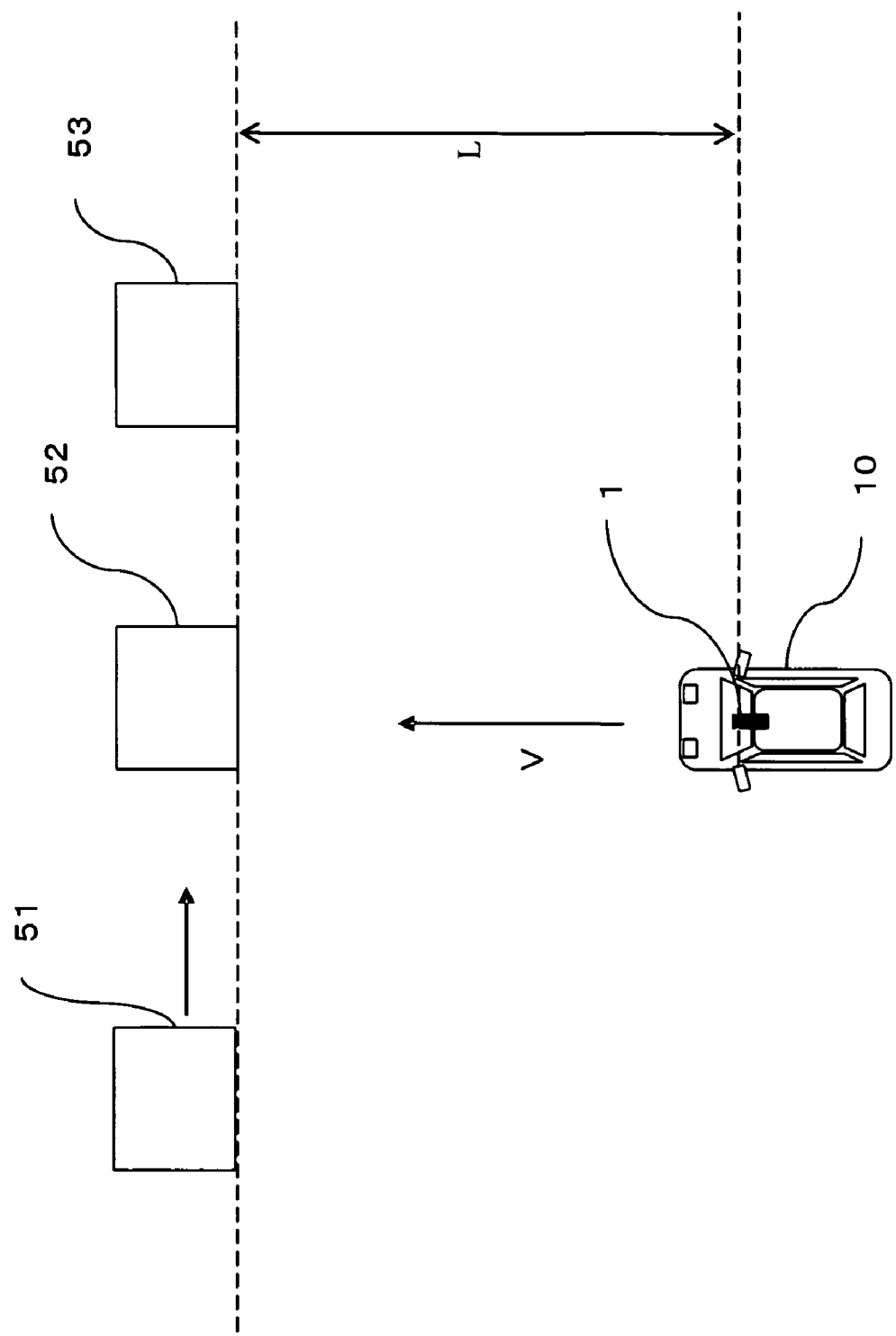

FIG. 6 shows three obstacles 51, 52 and 53 present ahead of the vehicle 10 having installed therein the camera 1. As shown in FIG. 6, the three obstacles 51 to 53 are distanced from the vehicle 10 by L. It is assumed that the vehicle 10 is advancing along the direction indicated by the arrow in FIG. 6, and the relative speeds between the vehicle 10 and the obstacles 51 to 53 measured along the vehicle advancing direction, are all V. Under these circumstances, the contact time TTC calculated for each of the obstacles 51 to 53 based upon the distance L and the relative speed V is invariably TTC=L/V, the lengths of time to elapse before the contact are equal to each other for all the obstacles 51 to 53. In this situation, the obstacle 52 present ahead of the vehicle 10 will collide with the vehicle 10 if the vehicle 10 continues to travel straight ahead. However, the obstacle 53 will not collide with the vehicle 10 even if the vehicle 10 keeps traveling ahead and will merely pass by the vehicle 10. Accordingly, no warning needs to be issued with regard to the obstacle 53 which does not pose any danger to the vehicle 10. The obstacle 51, which is moving toward the obstacle 52 as indicated by the arrow in FIG. 6, however, may contact the vehicle 10 and accordingly, a warning should be issued with regard to the obstacle 51.

The contact time calculation apparatus in the second embodiment issues a warning for the driver by taking into consideration the likelihood of contact between an object in the captured image and the subject vehicle. It is to be noted that the contact time calculation apparatus in the second embodiment adopts a structure identical to that of the contact time calculation apparatus in the first embodiment shown in FIG. 1.

Figure 7:
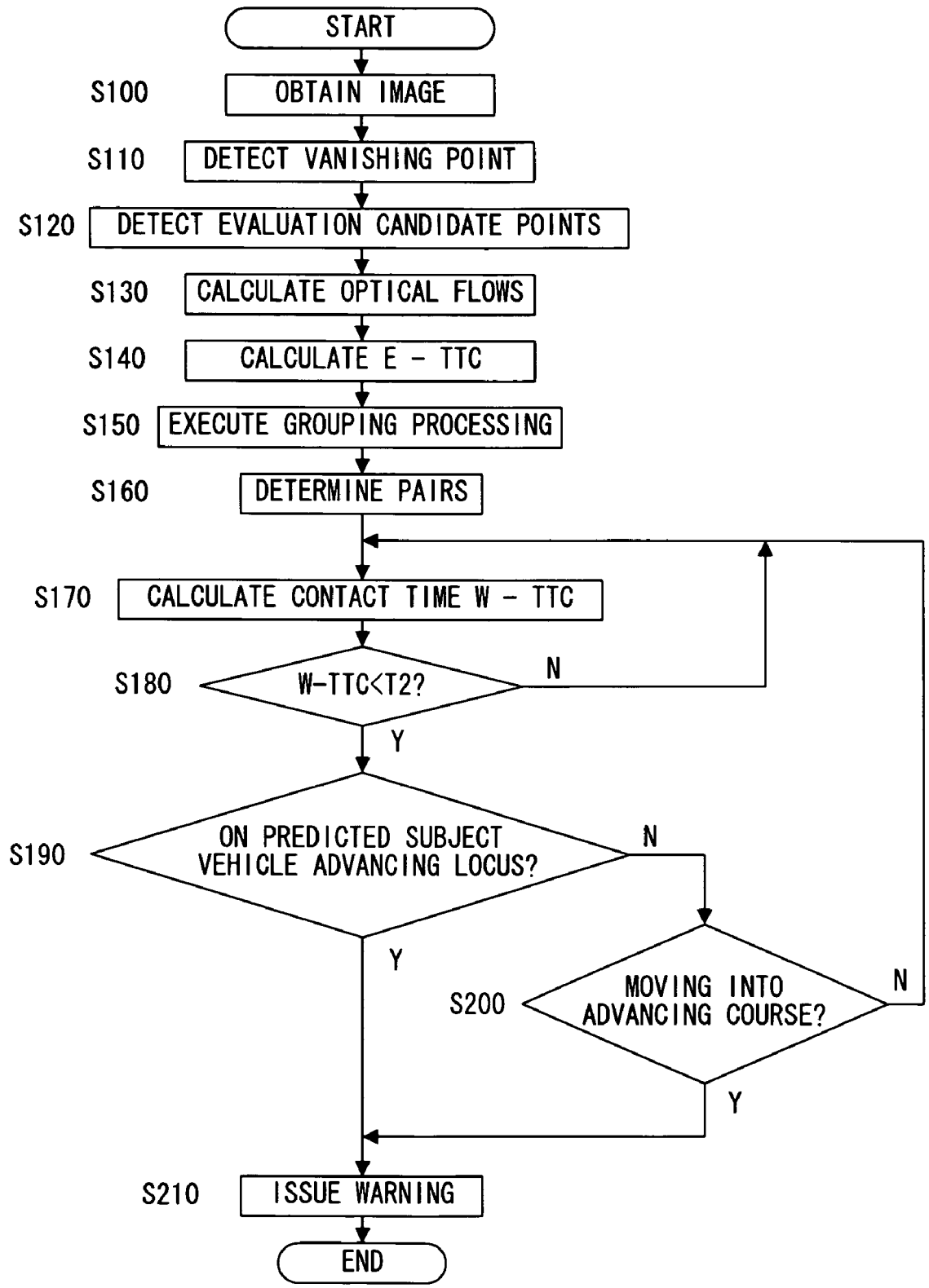
FIG. 7 presents a flowchart of the processing executed by the contact time calculation apparatus in a second embodiment.

FIG. 7 presents a flowchart of the processing executed by the contact time calculation apparatus in the second embodiment. As a key switch (not shown) is turned on in the vehicle, the arithmetic unit 2 starts the processing in step S100. In step S100, the image captured by the camera 1 is obtained and then the operation proceeds to step S110.

Figure 8:
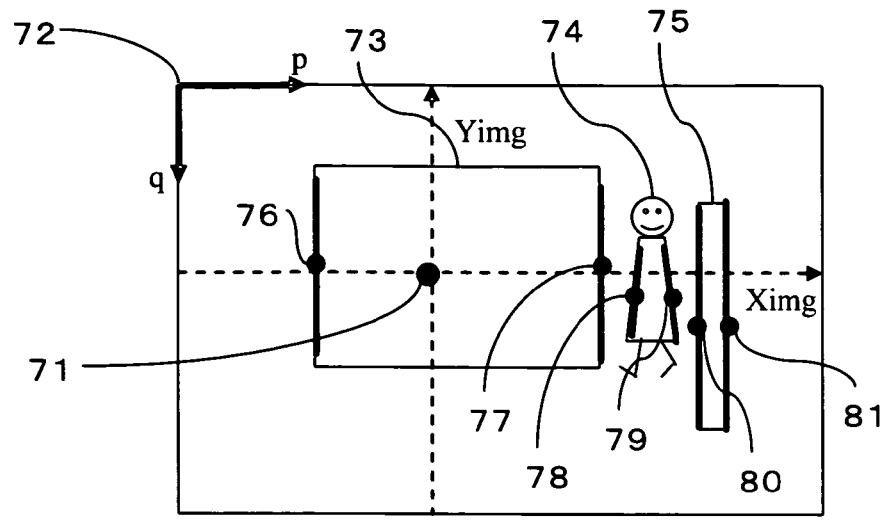
FIG. 8 presents an example of an image that may be captured with the camera.

In step S110, a vanishing point in the image obtained in step S100 is detected. The vanishing point can be detected by adopting any method in the related art. FIG. 8 presents an example of an image that may be captured by the camera 1. It is assumed that the vanishing point is detected at a position indicated by reference numeral 71 in FIG. 8. The arithmetic unit 2 saves into the memory 3 the coordinate values (pfoe, qfoe) of the vanishing point 72 in the pq coordinate system with which the image plane is described before the operation proceeds to step S120.

In step S120, the positions of characteristic points with respect to which optical flows can be calculated are extracted from the image having been obtained in step S110. The characteristic points are each extracted at a middle point of a longitudinal edge detected on the captured image. Points 76 to 81 are extracted as characteristic points in the image shown in FIG. 8. These characteristic points are all used as candidate points from which two points (evaluation points) belonging to a single object are extracted and accordingly, the characteristic points are each assigned with an identification number n (n=0, 1, . . . N). It is to be noted that N indicates the number of extracted characteristic points (evaluation candidate points). Once the coordinate values (pn, qn) (n=0, 1, . . . N) of the characteristic points in the image plane-fixed coordinate system indicated by reference numeral 72 are saved into the memory 3, the operation proceeds to step S130.

In step S130, the optical flow of each characteristic point having been extracted in step S120 is calculated. The optical flow calculation can be executed by using a method in the known art such as the gradient-based method or the characteristic point tracking method. As the following processing is executed based upon movements occurring along the lateral direction in the image, i.e., along the p axis in the image plane-fixed pq coordinate system 72, optical flow values (dpn/dt) (n=0, 1, . . . , N) along the p axis are determined in correspondence to the individual characteristic points. Once the optical flow values (dpn/dt) along the p axis are determined in correspondence to the individual characteristic points and the optical flow values are saved into the memory 3, the operation proceeds to step S140.

In step S140, an evaluation quantity E–TTC is calculated for each of the characteristic points 76 to 81. The evaluation quantity E–TTC calculated in this step is expressed as in (19) below.

$$E\text{-}TTCn = Ximg_n/(dXimg_n/dt)(n=0, 1, \ldots, N) \quad (19)$$

$Ximg_n$ in the expression above indicates a coordinate value of the characteristic point on the Ximg axis in the coordinate system the origin point of which is set at the vanishing point 71, and is expressed as in (20) below. As explained earlier, pn indicates the coordinate value taken along the p axis for a given characteristic point and pfoe indicates the coordinate value taken along the p axis for the vanishing point 71.

$$Ximg_n = pn - pfoe (n=0, 1, \ldots, N) \quad (20)$$

As shown in FIG. 8, the Ximg axis is set parallel to the p axis in the image plane-fixed coordinate system indicated by reference numeral 72, and accordingly, the time differential value of a coordinate value set in the coordinate system the origin point of which is set at the vanishing point and the time differential value of the corresponding coordinate value set in the image plane-fixed coordinate system assume values equal to each other (see expression (21) below).

$$dXimg_n/dt = dpimg_n/dt \quad (21)$$

Once the evaluation quantities E–TTC are determined and saved into the memory 3 for all the characteristic points having been extracted in step S120, the operation proceeds to step S150. In step S150, grouping processing is executed to form pairs each constituted with two points among the characteristic points 76 to 81 based upon the evaluation quantities E–TTC having been calculated in step S140. More specifically, each pair of characteristic points with their evaluation quantities E–TTC indicating values equal to each other is identified. For instance, assuming that the relationship expressed in (22) below exists among the characteristic points 76 to 81 respectively indicated with identification numbers n76, n77, n78, n79, n80 and n81, four pairs, m1: (76, 77), m2: (78, 79), m3: (79, 80) and m4: (80, 81) are identified. m1 to m4 each indicate a pair number assigned to a specific pair.

$$E\text{-}TTCn_{76} = E\text{-}TTCn_{77},$$

$$E\text{-}TTCn_{78} = E\text{-}TTCn_{79} = E\text{-}TTCn_{80} = E\text{-}TTCn_{81} \quad (22)$$

Since the objects 73, 74 and 75 in the image in FIG. 8 are objects independent of one another, the two points 79 and 80 in the pair m3 among the four pairs do not belong to a single object. The characteristic points which do not belong to a single object are still grouped together as a pair for the following reason. When the movement of an object only contains a movement component parallel to the advancing direction of the image-capturing plane (the vehicle advancing direction) i.e., parallel to the direction toward the vanishing point from the center of the lens of the camera 1, E–TTC is calculated as the true contact time to elapse before the object comes into contact with the image-capturing plane of the camera 1. If, on the other hand, the movement of the object contains a movement component along a direction intersecting the image-capturing plane advancing direction as well, a value different from the actual contact time value is calculated as E–TTC. For this reason, the E–TTC values calculated at a given time point t for the characteristic points in the pair m3, belonging to different objects with varying lengths of time to elapse before contact, may be equal to each other.

Upon completing the grouping processing executed based upon the evaluation quantities E–TTC, the numbers assigned to the individual pairs and the numbers assigned to the characteristic points in the individual pairs are saved into the memory 3, and then the operation proceeds to step S160. In step S160, a decision is made as to whether or not the characteristic points in each of the pairs identified in step S150 belong to a single object. First, by referencing coordinate values (pn'(t–Δt), qn'(t–Δt))(n'=0, 1, . . . N') (N' indicates the number of characteristic points extracted at the time point t–Δt) ascertained at a processing time point t–Δt in the past which are saved in the memory 3, the characteristic points corresponding to the individual characteristic points (pn, qn) (n=0, 1, . . . , N) extracted at the current processing time point t are determined. r(n) indicates an identification number assigned to the characteristic point extracted at the time point t–Δt, which corresponds to the characteristic point assigned with the identification number n and extracted at the current processing time point t. The corresponding points can be determined through any method of the related art such as normalized correlational matching.

Next, the evaluation quantities E–TTCr(n) of the characteristic points assigned with the identification numbers r(n) extracted at the time point t–Δt are read from the memory 3 and a decision is made with regard to each pair identified at the time point t as to whether or not the values of E–TTCr(n) calculated at the time point t–Δt for the two points in the pair are equal to each other. If the values of E–TTCr(n) of the two points are equal to each other, the two points are judged to belong to a single object. If the values of E–TTCr(n) corresponding to the two points are different, the two points are judged to belong to different objects and the pair made up of these two points is deleted from the memory 3.

In the example described above, if E–TTCr($n_{79}$)≠E–TTCr($n_{80}$) is true with r($n_{79}$) and r($n_{80}$) respectively representing the identification numbers assigned to the characteristic points at the time point t−Δt corresponding to the characteristic points 79 and 80 in the pair m3, the characteristic points 79 and 80 are judged to belong to different objects and the pair m3 is deleted from the memory 3.

The evaluation quantities E−TTCr(n) calculated for the characteristic points at the time point t−Δt which is different from the time point t are used to decide whether or not the characteristic points in each of the pairs identified at the processing time point t belong to a single object for the following reason. If the characteristic points in the pair belonged to a single object, their evaluation quantities E−TTC invariably assume values equal to each other at any time point. While the evaluation values E−TTC of characteristic points belonging to different objects may momentarily assume values equal to each other as explained earlier, the values of the evaluation quantities E−TTC do not remain equal to each other over time. Accordingly, if two points achieving evaluation quantity values E−TTC equal to each other at the time point t also achieved equal evaluation quantity values E−TTC at the past time point t−Δt, the two points are judged to belong to a single object, whereas if the two points assumed E−TTC values different from each other at the past time point t−Δt, they are judged to belong to different objects.

In step S170, which follows step S160, a contact time is calculated for the pair having been judged in step S160 to belong to a single object. The contact time W−TTC is expressed as in (23) below.

$$W\text{-}TTC = Wm/(dWm/dt) \quad (23)$$

With nma and nmb representing the identification numbers assigned to the two points in the pair, Wm is expressed as in (24) below.

$$Wm = |p_{nmb} - p_{nma}| \quad (24)$$

The denominator in the right side member in expression (23) is the time differential value of Wm, which can be expressed as in (25) below.

$$dWm/dt = d(p_{nmb} - p_{nma})/dt = (dp_{nmb}/dt) - (dp_{nma}/dt) \quad (25)$$

when $p_{nma} < p_{nmb}$.

In step S180 which follows step S170, a decision is made as to whether or not the contact time W−TTC having been calculated in step S170 is smaller than a predetermined threshold value T2. If it is decided that W−TTC<T2 is true, the operation proceeds to step S190, whereas if it is judged that W−TTC<T2 is not true, the operation returns to step S170 to calculate the contact time W−TTC for another pair. Namely, if it is decided in step S180 that W−TTC<T2 is not true, the processing in steps S170 and S180 is repeatedly executed until the contact time values W−TTC are calculated for all the pairs.

In step S190, a decision is made as to whether or not the object to which the two points in the pair having been determined in step S180 in order to satisfy the rational expression W−TTC<T2 belong is present along the advancing direction of the subject vehicle. If the x coordinates of the two points in the pair satisfying the rational expression W−TTC<T2 bear different positive/negative signs along the x-axis in the coordinate system the origin point of which is the vanishing point, the object is judged to be present on the locus along which the subject vehicle is advancing. Namely, if $p_{nma} \times p_{nmb} < 0$ is true with regard to the coordinates $p_{nma}$ and $p_{nmb}$ of the two points in the coordinate system with the origin point along the p axis in FIG. 8 set at the vanishing point 71, the obstacle that contains the two points is judged to be present along the advancing direction of the subject vehicle.

For instance, since the two points 76 and 77 in FIG. 8 are present on the opposite sides of the vanishing point, pn76× pn77<0 is true, and accordingly, the obstacle 73 is judged to be present along the advancing direction of the subject vehicle. The operation proceeds to step S210 if the object is judged to be present along the advancing direction of the subject vehicle in step S190, whereas the operation proceeds to step S200 if it is decided in step S190 that the object is not present along the advancing direction of the subject vehicle.

In step S200, a decision is made as to whether or not the obstacle containing the two points making up the pair, which is not present along the advancing direction of the subject vehicle, is likely to move into the advancing course of the subject vehicle based upon the E−TTC values having been calculated in step S140 and the W−TTC value having been calculated in step S170. For instance, if the relationship expressed in (26) or (27) below is true with regard to the two points making up the pair m, the obstacle corresponding to the pair m is judged to be an obstacle moving into the advancing course of the subject vehicle.

$$W\text{-}TTCm < E\text{-}TTC_{nma} \quad (26)$$

$$W\text{-}TTCm < E\text{-}TTC_{nmb} \quad (27)$$

When the relationship expressed as in (26) or (27) is true, the obstacle corresponding to the pair m is judged to be an obstacle moving into the advancing course of the subject vehicle for the following reason.

Figure 9:
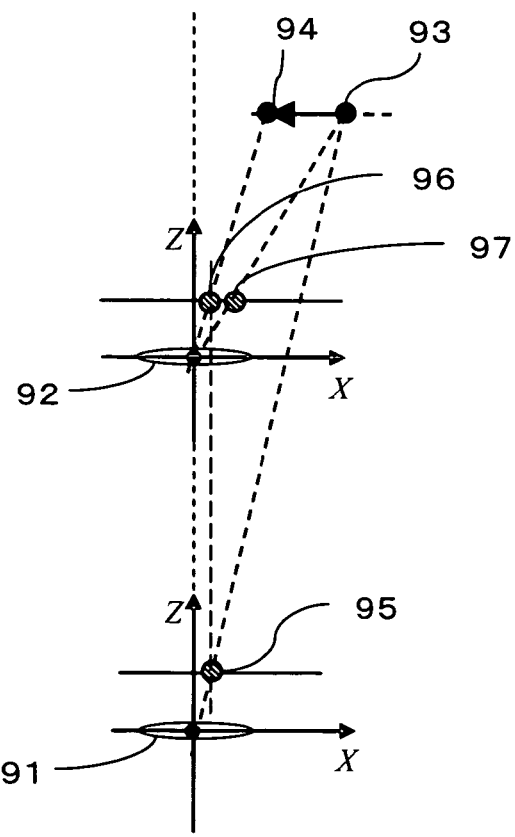
FIG. 9 illustrates that the extent of movement of a characteristic point of an object on the image, moving toward the advancing course of the image-capturing plane, is smaller than the extent of movement of a characteristic point of a stationary object on the image.

As explained in reference to the contact time calculation apparatus in the first embodiment, W−TTCm is calculated as the true contact time even when the moving vector of the object intersects the advancing vector of the image-capturing surface. However, as the expression E−TTCn=Ximg$_n$/(dX-img$_m$/dt) indicates (see expression (19)), the extent of the movement of the characteristic point on the image, i.e., the absolute value of dXimg$_n$/dt, is smaller when the object is heading into the advancing course of the image-capturing plane than when the object is a stationary object. In contrast, when the object is moving further away from the advancing course of the image-capturing surface, the absolute value of dXimg$_n$/dt is greater than when the object is a stationary object. This point is now explained in reference to FIG. 9.

Let us assume that the lens of the camera 1 located at a position 91 at the time point t moves to assume a position 92 at the time point t+Δt. In addition, it is assumed that an obstacle present at a position 93 at the time point t moves to assume a position 94 at the time point t+Δt. Under these circumstances, the obstacle assumes a position 95 on the image-capturing plane of the camera 1 at the time point t, whereas the obstacle assumes a position 96 on the image-capturing plane at the time point t+Δt.

Let us hypothesize that the obstacle has remained stationary and is still located at the position 93 at the time point t+Δt. In this case, the obstacle assumes a position 97 on the image-capturing plane at the time point t+Δt. If the obstacle is approaching the advancing course of the subject vehicle (93->94), the extent of the movement of the obstacle on the image-capturing surface, i.e., the absolute value of dximgn/dt is smaller than the absolute value calculated for the stationary obstacle. Namely, if the obstacle is moving closer to the advancing course of the subject vehicle, the denominator of the evaluation quantity E−TTC assumes a smaller value, which increases the E−TTC value. Based upon this principle, a decision can be made by using expression (26) or (27) as to whether or not the obstacle is moving closer to a collision course directly ahead of the subject vehicle.

If it is decided in step S200 that the obstacle containing the two points making up the pair undergoing the arithmetic operation is moving toward the advancing course of the subject vehicle, the operation proceeds to step S210. If, on the other hand, it is decided that the obstacle containing the two points making up the pair is not moving toward the advancing course of the subject vehicle, the operation returns to step S170 to execute the processing described above on a pair that has not undergone the processing in step S170 and subsequent steps.

In step S210, the arithmetic unit 2 outputs a warning command for the warning device 4. In response to the warning command, the warning device 4 outputs a warning for the driver.

The contact time calculation apparatus in the second embodiment ascertains the coordinate values of evaluation candidate points each of which may be used as an evaluation point making up a pair of evaluation points belonging to a single object in reference to coordinate axes taken by setting a vanishing point on the image as the origin point, calculates an optical flow value based upon a coordinate value of each evaluation candidate point, calculates an evaluation quantity E–TTC by dividing the coordinate value of the candidate point by the optical flow value corresponding to the coordinate value of the evaluation candidate point and extracts evaluation points based upon the individual evaluation quantities E–TTC thus calculated. Through this method, each pair of points belonging to a single object in the captured image can be extracted with ease. In addition, it calculates the evaluation quantities E–TTC at least twice at different time points and extracts a pair of evaluation candidate points to be used as evaluation points only if their evaluation quantities E–TTC calculated at the different time points invariably indicate values equal to each other. As a result, a pair of points belonging to a single object in the captured image can be extracted with an even higher level of accuracy.

Furthermore, the contact time calculation apparatus in the second embodiment makes a decision as to whether or not a given object containing evaluation points is going to move across the advancing course of the camera 1 based upon the evaluation quantities E–TTC and the contact time W–TTC and it is thus able to issue a warning for an object about to move across the advancing course of the camera 1. Namely, the warning issued based upon the length of time to elapse before an obstacle comes into contact with the vehicle (before it reaches the image-capturing plane of the camera 1) is not issued if there is no likelihood of the obstacle contacting the vehicle.

THIRD EMBODIMENT

Figure 10:
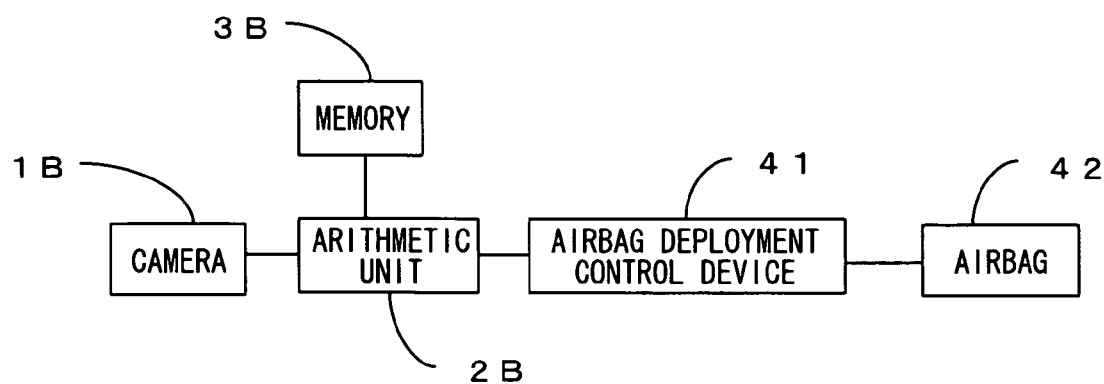
FIG. 10 shows the structure adopted in the contact time calculation apparatus in a third embodiment.
Figure 11:
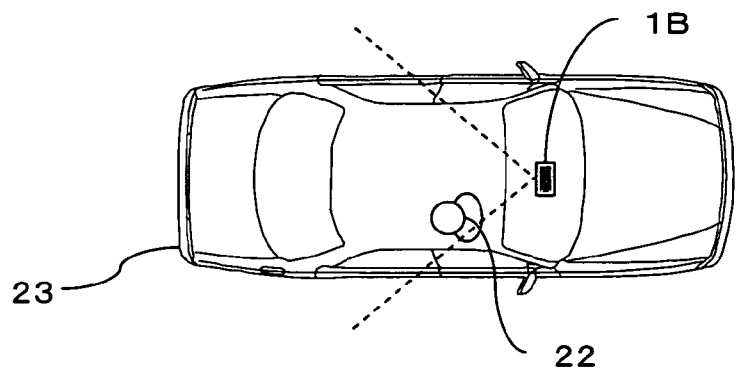
FIG. 11 presents an example of a camera installation position that may be assumed in the contact time calculation apparatus in the third embodiment.

FIG. 10 shows the structure adopted in the contact time calculation apparatus in the third embodiment. The contact time calculation apparatus in the third embodiment includes a camera 1B, an arithmetic unit 2B, a memory 3B, an air bag deployment control device 41 and an air bag 42. The camera 1B, which may be, for instance, an infrared camera, is installed inside the cabin at a position at which image of the driver's face can be captured. FIG. 11 shows an example in which the camera 1B is installed at the center of the dashboard of a vehicle 23 to ensure that an image of the face of a driver 22 can be captured.

The arithmetic unit 2B calculates the length of time to elapse before the driver strikes the dashboard at which the camera 1B is installed in the event of a vehicular collision or the like based upon the image captured by the camera 1B. The airbag deployment control device 41 controls deployment of the airbag 42 based upon the contact time calculated by the arithmetic unit 2B.

Figure 12:
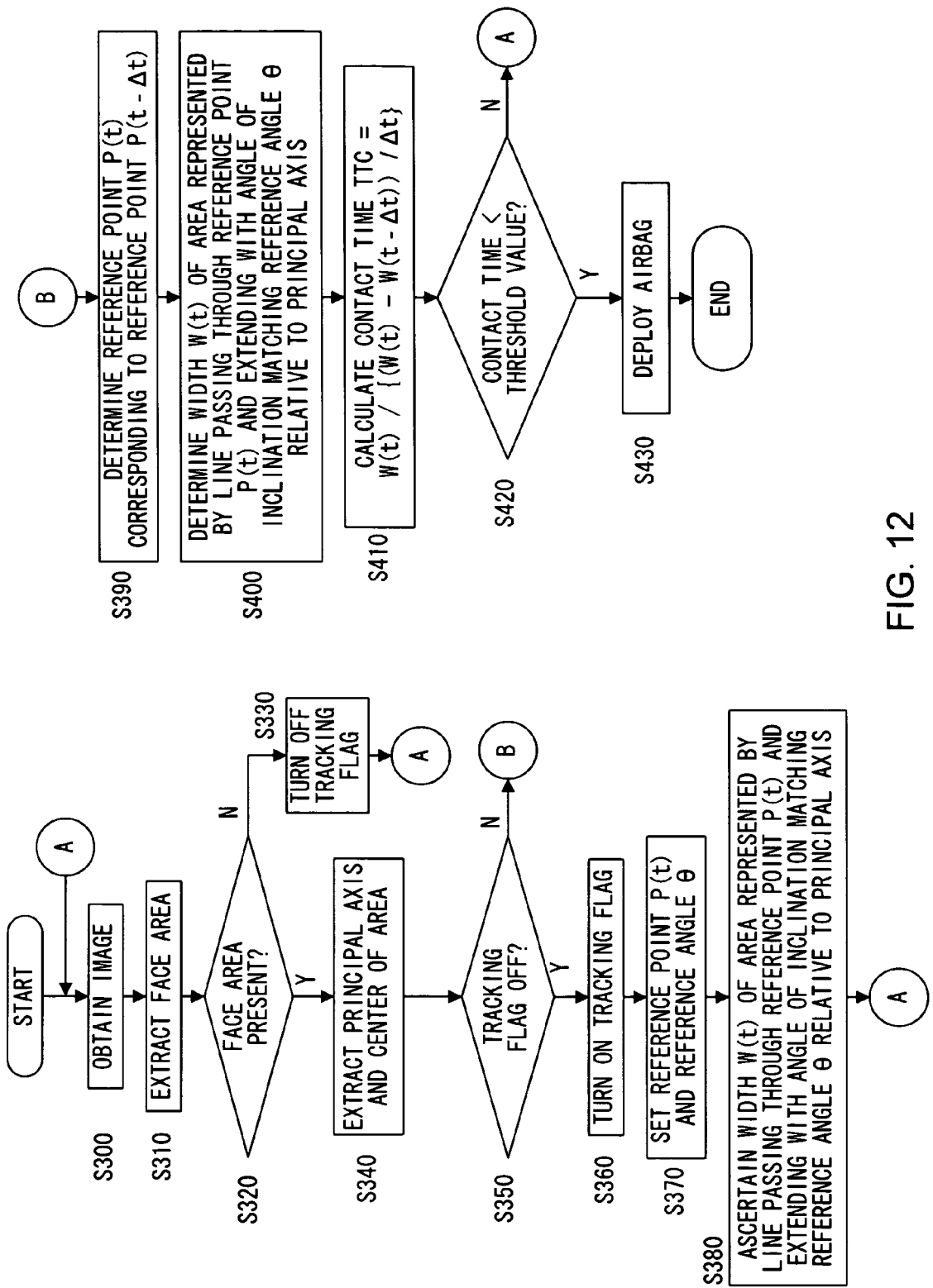
FIG. 12 presents a flowchart of the processing executed by the contact time calculation apparatus in the third embodiment.

FIG. 12 presents a flowchart of the processing executed by the contact time calculation apparatus in the third embodiment. As a key switch (not shown) at the vehicle is turned on, the arithmetic unit 2B starts the processing in step S300. In step S300, the image captured by the camera 1B is obtained and then the operation proceeds to step S310.

In step S310, processing for extracting a pixel area over which the driver's face has been photographed is executed based upon the image obtained in step S300. Any method in the known art may be adopted when executing the processing for extracting the area over which a person's face has been photographed. Once the processing for extracting the area over which the driver's face has been photographed (hereafter referred to as a face area) from the captured image is completed, the operation proceeds to step S320.

In step S320, a decision is made based upon the results of the processing executed in step S310 as to whether or not a face area is present in the captured image. If it is decided that the captured image does not contain an area over which the driver's face has been photographed, the operation proceeds to step S330. In step S330, a tracking flag stored in the memory 3B is turned off before the operation returns to step S300. If, on the other hand, it is decided that a face area is present in the captured image, the operation proceeds to step S340.

In step S340, the principal axis and the center of the face area in the captured image are determined through, for instance, principle component analysis. Since the principle component analysis is a method of the known art, a detailed explanation thereof is omitted. In step S350 which follows step S340, a decision is made as to whether or not the tracking flag stored in the memory 3B is in an off state. It is to be noted that when the key switch is turned on, i.e., when the vehicle is started up, the tracking flag is in an off state. The operation proceeds to step S360 if the tracking flag is judged to be in an off state, whereas the operation proceeds to step S390 if it is judged to be in an on state.

Figure 13B:
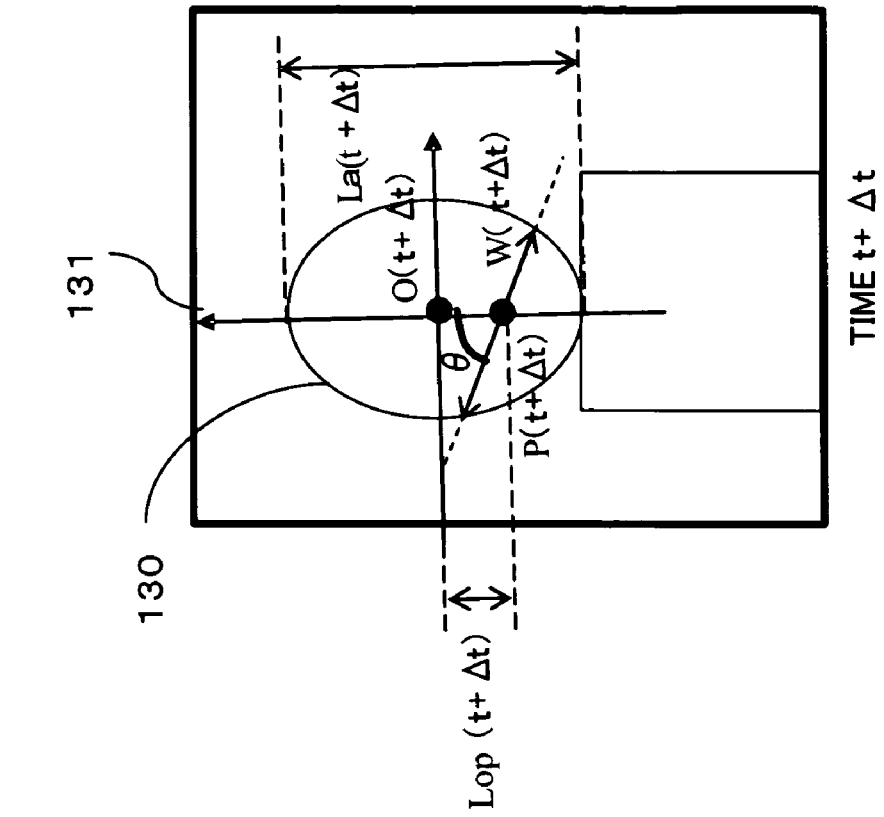
FIG. 13A shows an example of an image captured at a given time point t and FIG. 13B presents an example of an image captured at a time point with a time lag Δt following the time point t at which the image in FIG. 13A is captured.
Figure 13A:
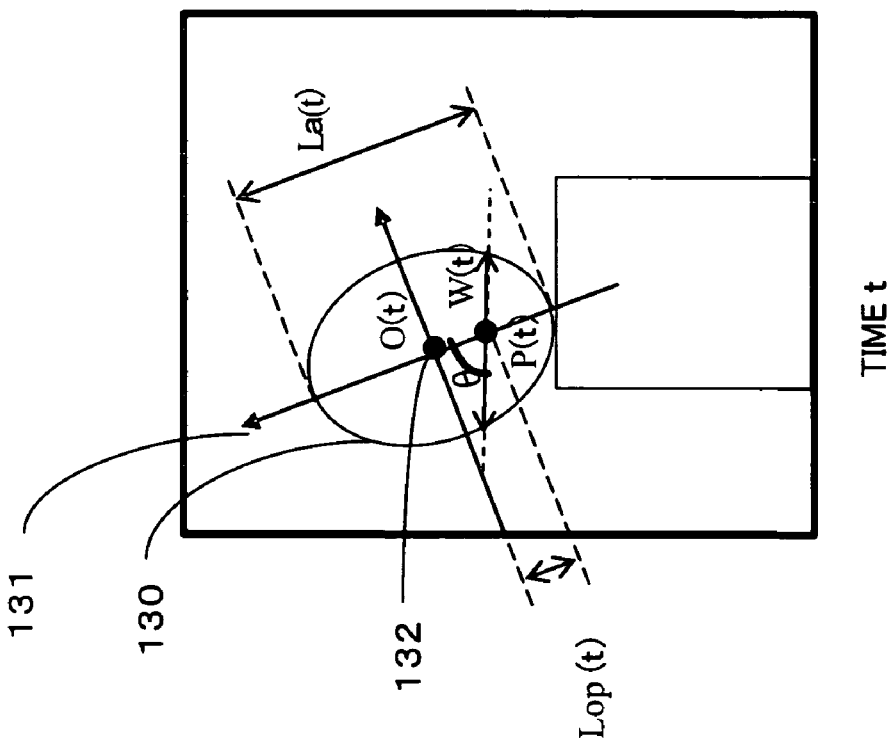

In step S360, the tracking flag is turned on and then the operation proceeds to step S370. In step S370, a reference point P(t) and a reference angle θ are set in the face area having been extracted. The method adopted when setting the reference point P(t) and the reference angle θ is now explained in reference to FIGS. 13A and 13B. FIG. 13A presents an example of an image captured by the camera 1B at a given time point t, whereas FIG. 13B presents an example of an image captured with a time lag Δt following the time point t at which the image in FIG. 13A is captured. The reference point P(t) is set on a principal axis 131 of the face area 130 at a position with a distance Lop from a center 132 of the face area 130. The distance Lop assumes a value (La×R1) obtained by multiplying the length La of the principal axis 131 inside the face area 130 by a predetermined ratio R1.

The angle formed by an axis extending along the horizontal direction relative to the vehicle body and the principal axis is used as the reference angle θ, since if a vehicle experiences a contact along the forward/backward direction, passengers, too, move along the forward/backward direction under normal circumstances with the largest extent of rotation occurring along the direction perpendicular to the vehicle body and thus it is desirable to use the horizontal direction perpendicular to the rotating direction, along which a constant angle is maintained at all times relative to the image-capturing plane of the camera 1B, in the contact time calculation apparatus in the embodiment that calculates the contact time based upon a change occurring in the target width.

After setting the reference point P(t) and the reference angle θ in step S370, the operation proceeds to step S380. In step S380, a width W(t) of the face area represented by a line passing through the reference point P(t) and inclining relative to the principal axis 131 with the angle of inclination matching the reference angle θ is determined (see FIG. 13A) After the width W(t) is determined, the operation returns to step S300 to re-execute the processing in step S300 and subsequent steps.

In step S390, to which the operation proceeds after deciding in step S350 that the tracking flag is in an on state, a reference point corresponding to the reference point having been determined in the previous processing (step S370) is determined in the most recently captured image. Assuming that P(t−Δt) has been determined in step S370 by using the parameter R1 so as to ensure that Lop(t−Δt)=La(t−Δt)×R1, the point on the principal axis at which Lop(t)=La(t)×R1 is true at the current time point is determined as the corresponding reference point. The explanation is given by assuming that the processing in step S300 is executed over time intervals Δt with the reference point determined through the previous processing expressed as P(t−Δt) and the reference point in the most recently captured image corresponding to P(t−Δt) expressed as P(t).

In step S400 which follows step S390, a width W(t) of the face area contained in the most recently captured image, represented by a line passing through the reference point P(t) having been determined in step S390 and inclining relative to the principal axis with the angle of the inclination matching the reference angle θ, is determined. After the width W(t) is determined, the operation proceeds to step S410.

In step S410, the length of time TTC to elapse before the face in the image captured by the camera 1B, i.e., the driver's face (head), strikes the dashboard at which the camera 1B is installed is calculated based upon expression (28) presented below.

$$TTC=W(t)/((W(t)-W(t-\Delta t))/\Delta t) \quad (23)$$

It is to be noted that W(t−Δt) represents the width having been determined through the previous processing (step S380) and that W(t) represents the width determined through the current processing (step S400).

Upon determining the contact time TTC in step S410, the operation proceeds to step S420. In step S420, a decision is made as to whether or not the contact time TTC having been calculated in step S410 is smaller than a predetermined threshold value T3. The operation returns to step S300 if the contact time TTC is judged to be equal to or greater than the predetermined threshold value T3, whereas the operation proceeds to step S430 if the contact time is judged to be smaller than the predetermined threshold value T3.

In step S430, an instruction is issued for the airbag control device 41 to deploy the airbag 42 at a deployment speed corresponding to the contact time TTC. Namely, control is implemented so as to deploy the airbag 42 faster if the value representing the contact time TTC is smaller and to deploy the airbag 42 more slowly if the contact time value TTC is greater. As a result, the airbag 42, which is deployed in the event of a vehicular collision, protects the driver from excessive impact. Once the airbag deployment control is executed in correspondence to the contact time TTC, the processing in the flowchart presented in FIG. 12 ends.

The contact time calculation apparatus in the third embodiment extracts a face area in the captured image containing the driver's face, determines the width W(t) of the extracted face area represented by a line passing through the reference point and inclining relative to the principal axis with an angle of inclination thereof matching the reference angle θ and calculates the length of time to elapse before the driver's face (head) strikes the dashboard or the like at which the camera 1B is installed based upon the width W(t) having been calculated. Since the deployment of the airbag 42 is controlled based upon the contact time thus calculated, the airbag 42 is deployed at the optimal deployment speed. In other words, the airbag 42 is made to deploy faster if the contact time is shorter and the airbag 42 is made to deploy more slowly if the contact time is longer. As a result, the airbag 42 deployed in the event of a vehicular collision protects the driver from excessive impact.

FOURTH EMBODIMENT

Figure 14:
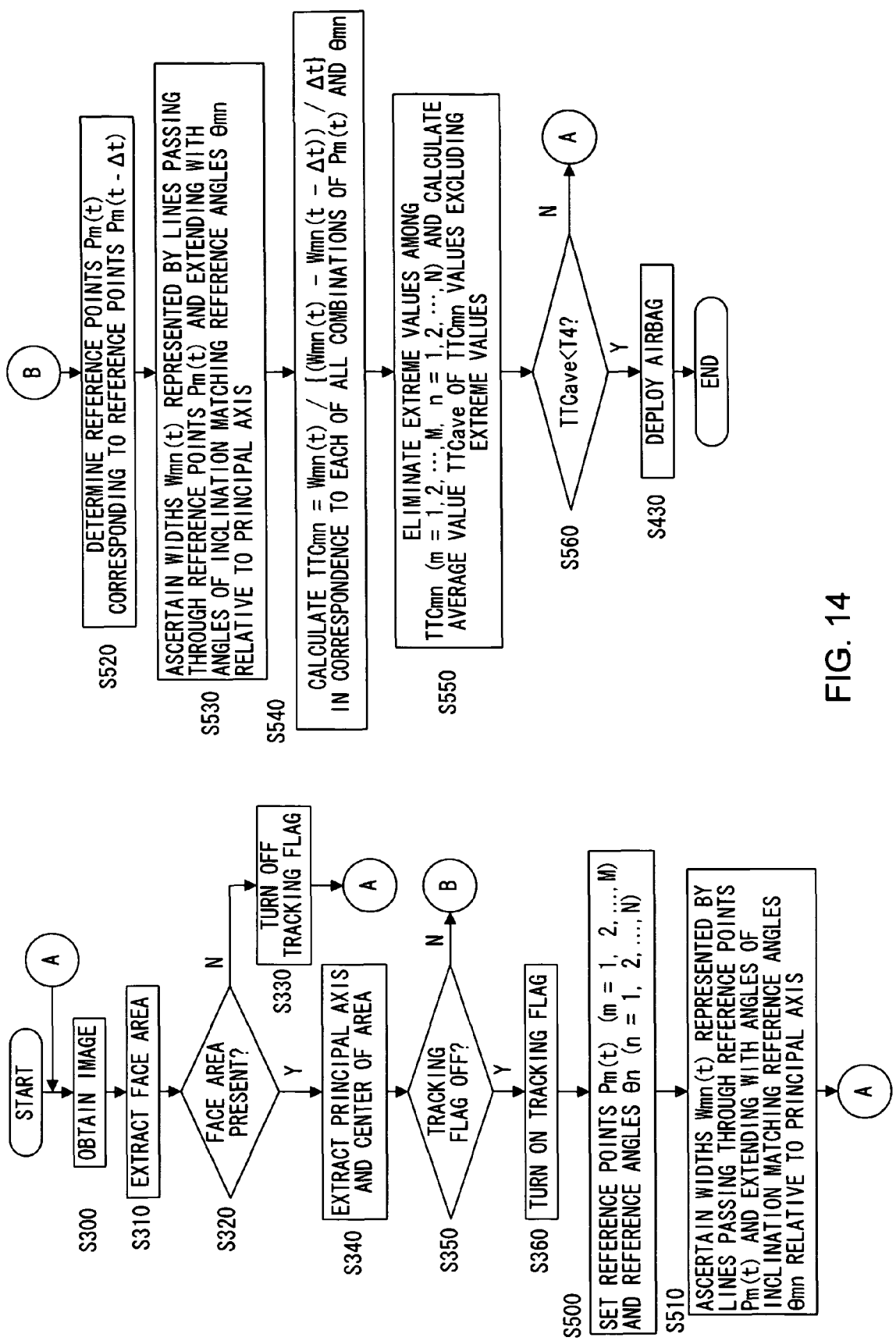
FIG. 14 presents a flowchart of the processing executed by the contact time calculation apparatus in a fourth embodiment.

The contact time calculation apparatus in the fourth embodiment adopts a structure identical to that of the contact time calculation apparatus in FIG. 10 in the third embodiment. FIG. 14 presents a flowchart of the processing executed by the contact time calculation apparatus in the fourth embodiment. The same step numbers are assigned to steps in which processing identical to the processing in the flowchart in FIG. 12 is executed to preclude the necessity for a detailed explanation thereof.

Figures 15A, 15B:
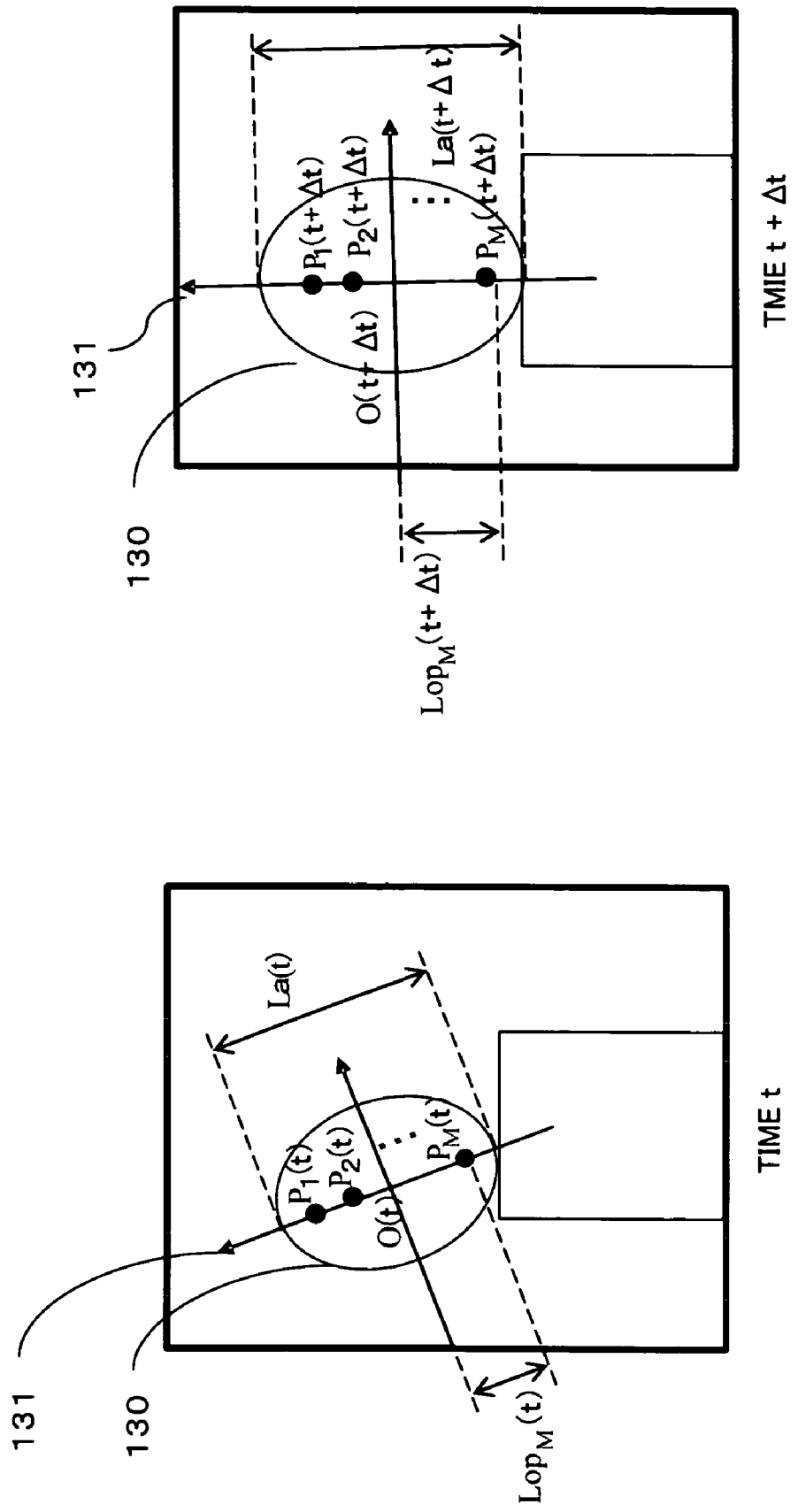
FIGS. 15A and 15B present an example of a plurality of reference point settings, with FIG. 15A showing an image captured at a time point t and FIG. 15B showing an image captured at a time point t+Δt.

The processing executed in steps S300 through S360 is identical to the processing executed in step S300 through step S360 in the flowchart presented in FIG. 12. In step S500 which follows step S360, a plurality of reference points Pm(t) {m =1, 2, . . . , M} and a plurality of reference angles θmn (n=1, 2, . . . , Nm) are set. The reference points Pm(t) can each be set by adopting the method through which the reference point P(t) is set in the third embodiment. Namely, a reference point Pm(t) is set on the principal axis 131 of the face area 130 at a position separated from the center 132 of the face area 130 over a distance Lop_m. The distance Lop_m assumes a value (La×Rm) obtained by multiplying the length La of the principal axis 131 inside the face area 130 by a predetermined ratio Rm. FIGS. 15A and 15B show the plurality of reference points Pm(t) set on the principal axis 131 of the face area 130, with the FIG. 15A showing an image captured at a time point t and FIG. 15B showing an image captured at a time point t+Δt.

Figure 16B:
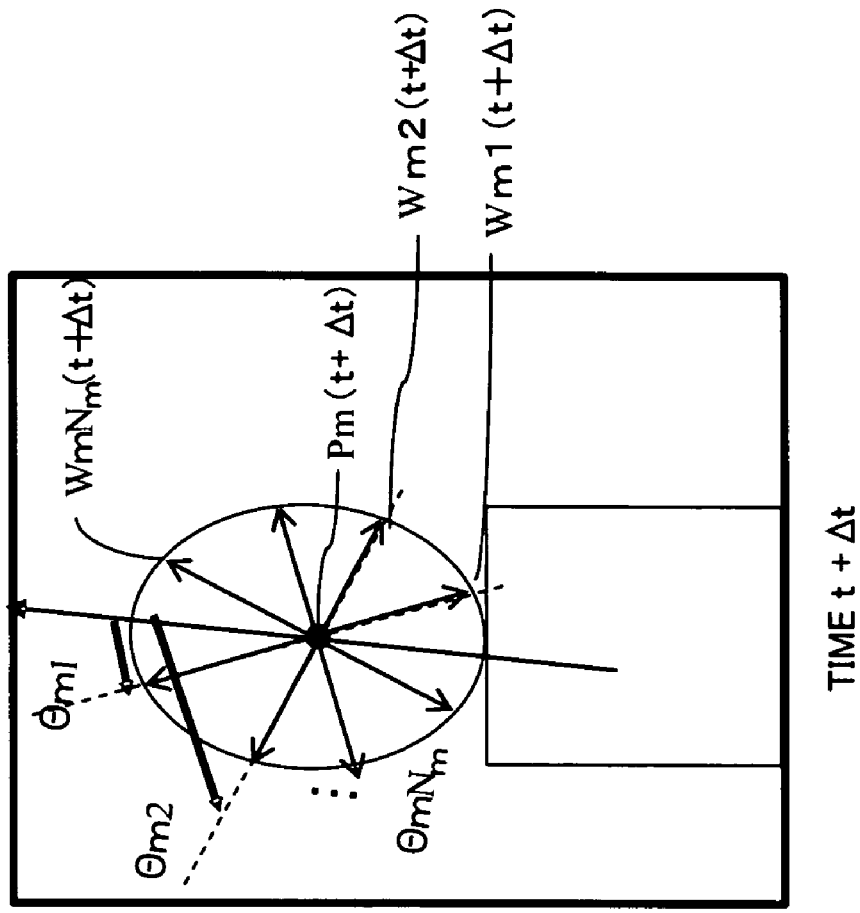
FIGS. 16A and 16B present an example of a plurality of reference angle settings, with FIG. 16A showing an image captured at a time point t and FIG. 16B showing an image captured at a time point t+Δt.
Figure 16A:
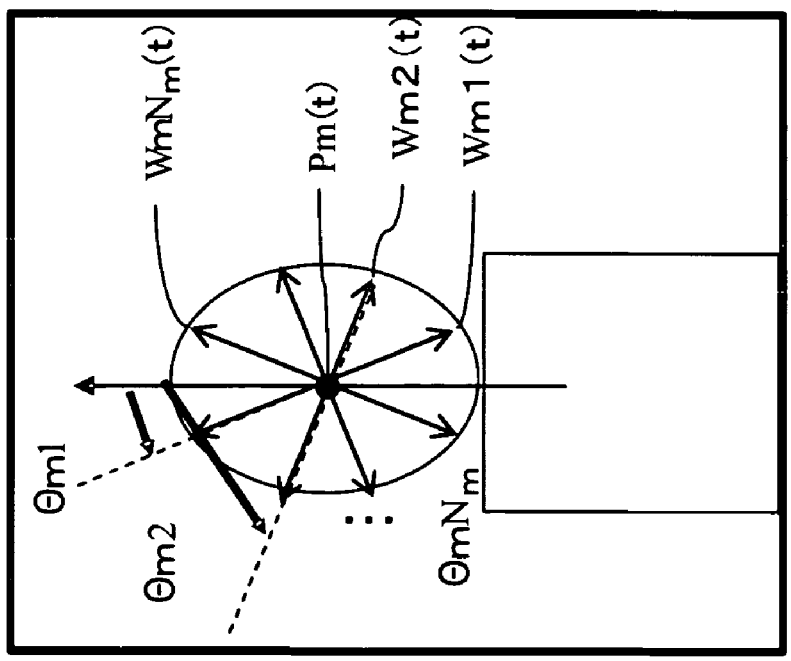

A plurality (Nm) of reference angles θmn are set along varying directions in correspondence to each reference point Pm(t). FIGS. 16A and 16B present an example of how Nm reference angles Emn may be set, with FIG. 16A showing an image captured at the time point t and FIG. 16B showing the image captured at the time point t+Δt. While it is desirable to set the reference angles along a plurality of directions extending at very small angles to the horizontal with respect to the vehicle body, it is not strictly essential that the plurality of directions extend with small angles relative to the horizontal direction. Once the plurality of reference points Pm(t) (m=1, 2, . . . , M) are set and the plurality of reference angles θmn (n=1, 2, . . . , Nm) are set in correspondence to the individual reference points Pm(t), the operation proceeds to step S510.

In step S510, the widths Wmn(t) of the face area represented by lines passing through each reference point Pm(t) and inclining with the reference angles θmn relative to the principal axis 131 are determined. FIGS. 16A and 16B also show the Nm widths Wmn(t) of the face area represented by the lines passing through a reference point Pm(t) and each corresponding to one of the plurality of reference angles θmn. In step S510, the widths Wmn(t) are determined in correspondence to all the reference points Pm(t) (m=1, 2, ... M). Once the widths Wmn(t) each corresponding to one of the Nm reference angles θmn are determined for each of the reference points Pm(t) (m=1, 2, ..., M), the operation returns to step S300.

If, on the other hand, it is decided in step S350 that the tracking flag stored in the memory 3B is in an on state, the operation proceeds to step S520. In step S520, reference points in the most recently captured image, each corresponding to one of the reference points having been determined in the previous processing (step S500), are determined. As explained earlier in reference to the third embodiment, a reference point having been determined through the previous processing is expressed as Pm(t−Δt) and the reference point in the most recently captured image corresponding to Pm(t−Δt) is expressed as Pm(t) with Δt representing time intervals over which the processing in step S300 is executed. Once the reference points Pm(t) corresponding to the reference points Pm(t−Δt) having been determined through the previous processing (step S500) are determined, the operation proceeds to step S530. Assuming that the previous reference points Pm(t−Δt) were set in step S500 by using the parameter Rm so as to ensure that Lop_m(t−Δt)=La(t−Δt)×Rm, the corresponding reference points Pm(t) are set at the current time point at positions on the principal axis at which Lop_m(t)=La(t)×Rm is true.

In step S530, the widths Wmn(t) of the face area contained in the most recently captured image represented by lines passing through each of the reference points Pm(t) determined in step S520 inclining with the reference angles θmn relative to the principal axis 131 are determined. In this step, the widths Wmn(t) are determined in correspondence to all the reference points Pm(t) (m=1, 2, ..., M), as in the processing executed in step S510. Once the widths Wmn(t) each corresponding to one of the Nm reference angles θmn are determined for each of the reference points Pm(t) (m=1, 2, ..., M), the operation proceeds to step S540.

In step S540, the length of time TTCmn to elapse before the face photographed in the image captured by the camera 1B, i.e., the driver's face (head), strikes the dashboard at which the camera 1B is installed is calculated. In this embodiment, contact time values TTCmn are determined each in correspondence to one of the widths Wmn(t) calculated for each reference point Pm(t).

$$TTCmn = Wmn(t)/\{(Wmn(t)-Wmn(t-\Delta t))/\Delta t\} \quad (29)$$

It is to be noted that Wmn(t−Δt) represents the width having been determined in the previous processing (step S510) and W(t) represents the width determined in the current processing (step S530).

Once the lengths of time TTCmn to elapse before contact are calculated in step S540, the operation proceeds to step S550. In step S550, extreme values among the values indicating the contact time TTCmn (m=1, 2, ..., M; n=1, 2, ..., Nm) having been calculated in step S540 are eliminated and an average value TTCave is calculated based upon the values other than the extreme values. In this example, the largest value and the smallest value among all the TTCmn values are determined and are eliminated as extreme values. It is to be noted that the average value TTCave may be expressed as in (30) below.

$$TTCave = (\Sigma_{m=1,2,\ldots,M}\Sigma_{n=1,2,\ldots,Nm}\delta nm \times TTCmn) / (\Sigma_{m=1,2,\ldots,M}\Sigma_{n=1,2,\ldots,Nm}\delta mn) \quad (30)$$

It is to be noted that δnm assumes the value 0 when the TTCmn value is an extreme value, whereas it assumes the value 1 when the TTCmn is not an extreme value.

Upon determining the contact time average value TTCave in step S550, the operation proceeds to step S560. In step S560, a decision is made as to whether or not the contact time average value TTCave having been calculated in step S550 is smaller than a predetermined threshold value T4. The operation returns to step S300 if the contact time average value TTCave is judged to be smaller than the predetermined threshold value T4, whereas the operation proceeds to step S430 if the contact time is judged to be equal to or greater than the predetermined threshold value T4. In step S430, an instruction is issued for the airbag control device 41 to deploy the airbag 42 at a deployment speed corresponding to the contact time average value TTCave. Once the airbag deployment control is executed in correspondence to the contact time average value TTCave, the processing in the flowchart presented in FIG. 14 ends.

The contact time calculation apparatus in the fourth embodiment enables airbag deployment control based upon the length of time to elapse before the driver strikes the dashboard or the like at which the camera 1B is installed in the event of a vehicular collision, as does the contact time calculation apparatus in the third embodiment. In addition, since the contact time can be calculated with an even higher level of accuracy by setting a plurality of reference points and a plurality of reference angles, more accurate airbag deployment control can be implemented based upon the contact time.

In addition, the contact time calculation apparatus in the fourth embodiment, which calculates the contact time average value by using values other than the largest value and the smallest value among the contact time values calculated based upon the plurality of reference points and the plurality of reference angles, is able to calculate an accurate contact time unaffected by noise and the like.

FIFTH EMBODIMENT

Figure 17:
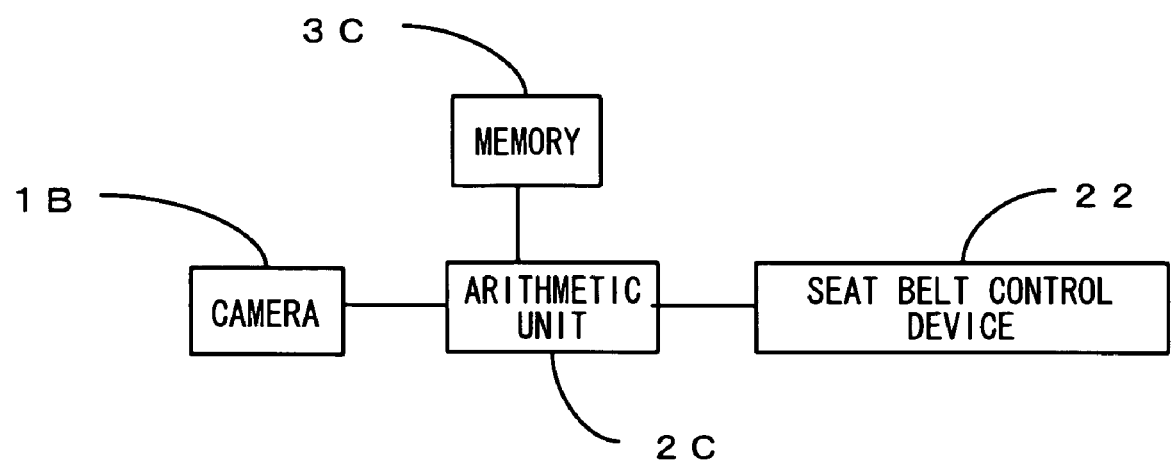
FIG. 17 shows the structure adopted in the contact time calculation apparatus in a fifth embodiment.
Figure 18:
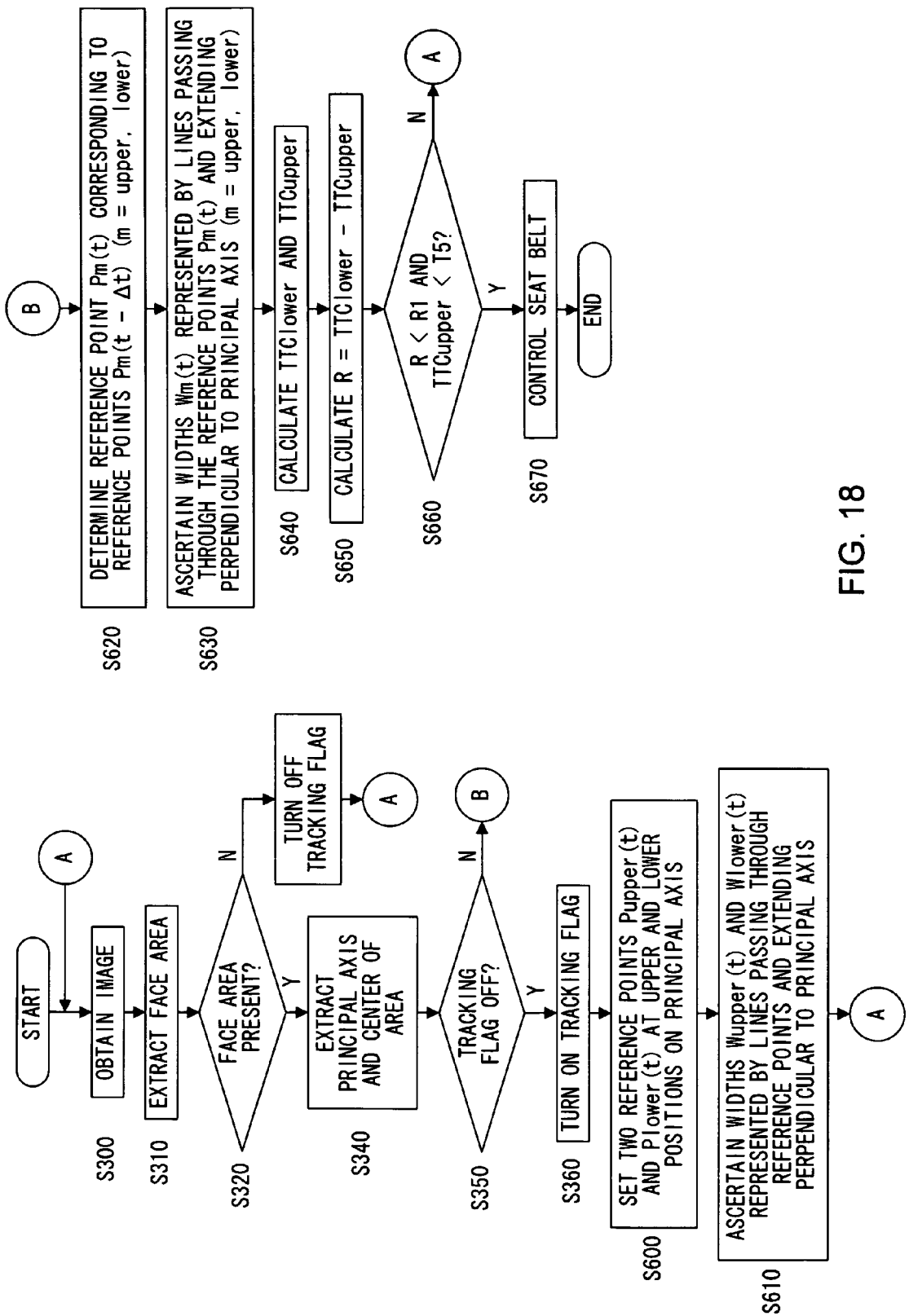
FIG. 18 presents a flowchart of the processing executed by the contact time calculation apparatus in the fifth embodiment.

FIG. 17 shows the structure of the contact time calculation apparatus in the fifth embodiment. The contact time calculation apparatus in the fifth embodiment includes a camera 1B, an arithmetic unit 2C, a memory 3C and a seat belt control device 43. The seat belt control device 43 executes retraction processing for seat belts (not shown) based upon the contact time calculated by the arithmetic unit 2C. FIG. 18 presents a flowchart of the processing executed by the contact time calculation apparatus in the fifth embodiment. The same step numbers are assigned to steps in which processing similar to that in the flowchart presented in FIG. 12 is executed to preclude the necessity for a detailed explanation thereof.

The processing executed in steps S300 through S360 is identical to the processing executed in step S300 through step S360 in the flowchart presented in FIG. 12. In step S600 which follows step S360, two reference points $P_{upper}(t)$ and $P_{lower}(t)$ are set on the principal axis of the face area in the captured image. FIGS. 19A and 19B show the two reference points Pm(t) set on the principal axis of the face area 130, with the FIG. 19A showing the image captured at a time point t and FIG. 19B showing the image capture data time point t+Δt. The distance between the two reference points, which may be set by adopting the method through which the reference point P(t) is set in the third embodiment may assume any value. In the embodiment, the reference point $P_{upper}(t)$ is set at a position higher than the center of the face area and the reference point $P_{lower}(t)$ is set at a position lower than the center of the face area.

In step S610, which follows step S600, widths $W_{upper}(t)$ and $W_{lower}(t)$ of the face area represented by lines respectively passing through the reference points $P_{upper}(t)$ and $P_{lower}(t)$ along a direction perpendicular to the principal axis 131 are determined (see FIG. 19A). Once the widths $W_{upper}(t)$ and $W_{lower}(t)$ are determined, the operation returns to step S300.

If, on the other hand, it is decided in step S350 that the tracking flag stored in the memory 3B is in an on state, the operation proceeds to step S620. In step S620, reference points in the most recently captured image, each corresponding to one of the reference points having been determined in the previous processing (step S600), are determined. The corresponding reference points can each be determined by adopting a method similar to the method having been explained in reference to the processing executed in step S370 in the flowchart presented in FIG. 12. As explained earlier in reference to the third embodiment, reference points having been determined through the previous processing are expressed as $P_{upper}(t-\Delta t)$ and $P_{lower}(t-\Delta t)$, and reference points in the most recently captured image corresponding to $P_{upper}(t-\Delta t)$ and $P_{lower}(t-\Delta t)$ is expressed as $P_{upper}(t)$ and $P_{lower}(t)$ with $\Delta t$ representing time intervals over which the processing in step S300 is executed. Once the reference points $P_{upper}(t)$ and $P_{lower}(t)$ corresponding to the reference points $P_{upper}(t-\Delta t)$ and $P_{lower}(t-\Delta t)$ determined through the previous processing (step S600), the operation proceeds to step S630 In step S630, widths $W_{upper}(t)$ and $W_{lower}(t)$ of the face area contained in the most recently captured image represented by lines extending perpendicular to the principal axis of the face area and passing through the reference points $P_{upper}(t)$ and $P_{lower}(t)$ having been determined in step S620 are calculated. After the widths $W_{upper}(t)$ and $W_{lower}(t)$ are calculated, the operation proceeds to step S640.

In step S640, the lengths of time $TTC_{upper}(t)$ and $TTC_{lower}(t)$ to elapse before the face photographed in the image captured by the camera 1B, i.e., the driver's face (head), strikes the dashboard or the like at which the camera 1B is installed are calculated. The lengths of time $TTC_{upper}(t)$ and $TTC_{lower}(t)$ to elapse before contact are calculated based upon the widths $W_{upper}(t)$ and $W_{lower}(t)$ respectively corresponding to the reference points $P_{upper}(t)$ and $P_{lower}(t)$ in this embodiment, as expressed in (31) below.

$$TTC_{upper}(t)=W_{upper}(t)/\{(W_{upper}(t)-W_{upper}(t-\Delta t))/\Delta t\}$$

$$TTC_{lower}(t)=W_{lower}(t)/\{(W_{lower}(t)-W_{lower}(t-\Delta t))/\Delta t\} \quad (31)$$

It is to be noted that $W_{upper}(t-\Delta t)$ and $W_{lower}(t-\Delta t)$ represent the widths calculated in the previous processing (step S610) and that $W_{upper}(t)$ and $W_{lower}(t)$ represent the widths calculated in the current processing (step S630).

In step S650, which follows step S640, a rotational index $R(t)$ is calculated as expressed in (32) below. The rotational index $R(t)$ is used as a decision-making index when executing seat belt retraction control.

$$R(t)=TTC_{lower}(t)-TTC_{upper}(t) \quad (32)$$

In step S660, which follows step S650, a decision is made as to whether or not the rotational index $R(t)$ having been calculated in step S650 is smaller than a predetermined threshold value R1 and whether or not the contact time $TTC_{upper}(t)$ is smaller than a predetermined threshold value T5. The operation proceeds to step S670 if it is decided that $R(t)$ <R1 and TTC upper(t)<T5 are both true, whereas the operation returns to step S300 if $R(t)$<R1 and $TTC_{upper}(t)$<T5 are not concurrently true. In step S670, the seat belt retraction processing is executed before the processing in the flowchart presented in FIG. 18 ends.

An explanation is now given on the method adopted in the decision-making executed in step S660. The contact time $TTC_{upper}(t)$ corresponding to the reference point $P_{upper}(t)$ indicates the length of time to elapse before the driver's head strikes the front dashboard or an object near the front dashboard in the event of a vehicular collision or an emergency braking operation, and the length of time to elapse before the impact is smaller if the contact time value $TTC_{upper}(t)$ is smaller. When the seat belt is fastened on the driver properly, the movement of the driver's torso is constrained and for this reason, a great extent of the rotation toward the front around the rotational axis at the driver's neck occurs. Under such circumstances, the contact time corresponding to $P_{upper}(t)$ around the driver's head is shorter than the contact time corresponding to the point $P_{lower}(t)$ in the face area, which is closer to the neck. Accordingly, the rotational index $R(t)$ assumes a larger value.

If, on the other hand, the seat belt is being worn loosely, the movement of the driver's torso is not constrained, and for this reason, as emergency braking is applied, the entire body of the driver is thrown forward, resulting in a small extent of rotation along the forward direction around the rotational axis set at the driver's neck. As a result, the difference between the contact time $TTC_{lower}(t)$ corresponding to the point $P_{lower}(t)$ in the face area, which is closer to the neck, and the contact time $TTC_{upper}(t)$ corresponding to the point $P_{upper}(t)$ around the driver's head becomes small, and the rotational index $R(t)$ assumes a smaller value.

Thus, if the contact time $TTC_{upper}(t)$ is smaller than the predetermined threshold value T5 and the rotational index $R(t)$ is smaller than the predetermined threshold value R1, it is judged that emergency braking is being applied to the vehicle and, at the same time, the seat belt is being worn loosely. Accordingly, the processing for retracting the seat belt is executed.

The contact time calculation apparatus in the fifth embodiment determines the contact time $TTC_{upper}(t)$ corresponding to the reference point $P_{upper}(t)$ set at a position close to the head of the driver in the face area and the contact time $TTC_{lower}(t)$ corresponding to the reference point $P_{lower}(t)$ set at position close to the neck, checks the extent to which the seat belt is currently fastened based upon the $TTC_{upper}(t)$ value and the $TTC_{lower}(t)$ value thus calculated and controls the tightness of the seat belt. Namely, the rotational index $R(t)$ is calculated based upon $TTC_{upper}(t)$ and $TTC_{lower}(t)$, and the seat belt retraction processing is executed if the calculated rotational index $R(t)$ is smaller than the predetermined threshold value R1 and, at the same time, the contact time $TTC_{upper}(t)$ is smaller than the predetermined threshold value T5, thereby further improving the driver's safety.

SIXTH EMBODIMENT

Figure 20:
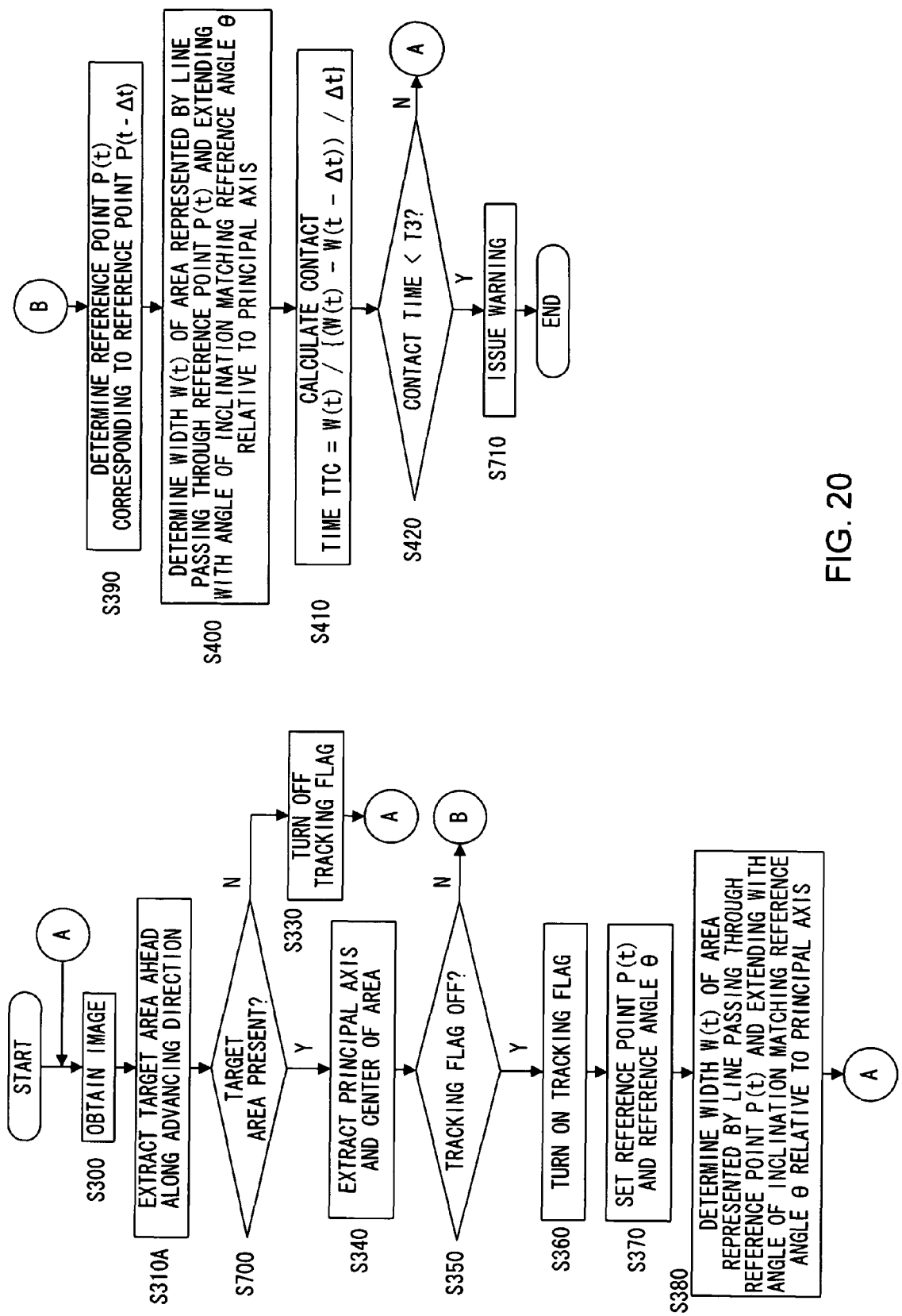
FIG. 20 presents a flowchart of the processing executed by the contact time calculation apparatus in a sixth embodiment.

The contact time calculation apparatus in the sixth embodiment adopts a structure identical to that of the contact time calculation apparatus shown in FIG. 1 in the first embodiment. FIG. 20 presents a flowchart of the processing executed by the contact time calculation apparatus in the sixth embodiment. The same step numbers are assigned to steps in which processing identical to the processing in the flowchart in FIG. 12 is executed to preclude the necessity for a detailed explanation thereof.

The processing executed in steps as 310A, S700 and S710 differentiates the processing in the flowchart shown in FIG. 20 from the processing executed as in the flowchart presented in FIG. 12. Accordingly, the following explanation focuses on the contents of the processing executed in steps S310A, S700 and S710.

After obtaining an image of a field ahead along the vehicle advancing direction in step S300, the operation proceeds to step S310A. In step S310A, processing for extracting an area along the vehicle advancing direction in the image obtained in step S300 as a target area is executed. Upon completing the target area extraction processing, the operation proceeds to step S700. In step S700, a decision is made based upon the results of the processing having been executed in step S310A as to whether or not the captured image contains a target area. In this embodiment, it is decided that a target area is present if an object is present along the vehicle advancing direction, i.e., if an object is present on the route yet to be traveled by the vehicle. The operation proceeds to step S340 if it is decided that a target area is present, whereas the operation proceeds to step S330 if it is decided that no target area is present.

Next, the processing executed in step S710 is explained. In step S710, to which the operation proceeds after it is decided in step S420 that the contact time TTC is smaller than the predetermined threshold value T3, a warning command is issued for the warning device 4. In response to the warning command, the warning device 4 outputs a warning for the driver.

As is the contact time calculation apparatus in the first embodiment, the contact time calculation apparatus in the sixth embodiment is capable of accurately calculating the length of time to elapse before an object contacts the vehicle regardless of the particular position at which the object is present on the image-capturing plane.

The present invention is not limited to the examples presented in the embodiments described above. For instance, while the difference between the coordinate values taken along the q axis is calculated when calculating the absolute value Wn of the difference between the coordinate values of the evaluation points in step S30 in the flowchart presented in FIG. 2, the difference between the coordinate values taken along the p axis may be calculated instead, or any coordinate system other than the pq coordinate system may be set and the difference between coordinate values in the alternative coordinate system may be calculated instead.

While longitudinal edges in the captured image are detected and middle points of the detected longitudinal edges are detected as characteristic points (evaluation candidate points) in step S120 in the flowchart presented in FIG. 7, other points may be detected as evaluation candidate points.

While the principal axis and the center of the face area contained in the captured image are determined by adopting the principle component analysis method in the third embodiment, the principal axis and the center may be determined through another method. For instance, a rectangular area circumscribing the face area may be set and a line segment passing through the center set at the gravitational center of the area, which inclines along the major axis of the circumscribing rectangle may be used as the principal axis.

In addition, the method for setting a reference point in the face area is not limited to the method described earlier. For instance, the center of the face area may be set as a reference point or a reference point may be set at a position off the central axis of the face area. Namely, as long as a reference point corresponding to a reference point set through the previous processing can be determined univalently within the image captured in the following processing, the reference point Pm(t) may be set at any position. Furthermore, a reference angle θ, too, may be set by adopting any method other than the method explained earlier.

While an explanation is given above on an example in which the processing in the flowchart presented in FIG. 12 starts in response to an on operation of the key switch (not shown), the processing may instead start as an incipient vehicular collision is detected by a collision sensor (not shown) or as emergency braking applied to the vehicle is detected, instead.

While the length of time to elapse before the driver's face (head) strikes the dashboard at which the camera 1B is installed is calculated in the third through fifth embodiments explained above, the airbag deployment may be controlled also based upon the length of time to elapse before the driver's torso strikes the dashboard as well as the length of time to elapse before the driver's head strikes the dashboard. In addition, an image of the face of a passenger in the passenger seat next to the driver's seat may be captured and the length of time to elapse before the passenger's face (head) strikes the dashboard may be calculated, as well. In this case, the deployment of the airbag installed on the passenger seat side, too, can be controlled based upon the contact time having been calculated.

Figure 21:
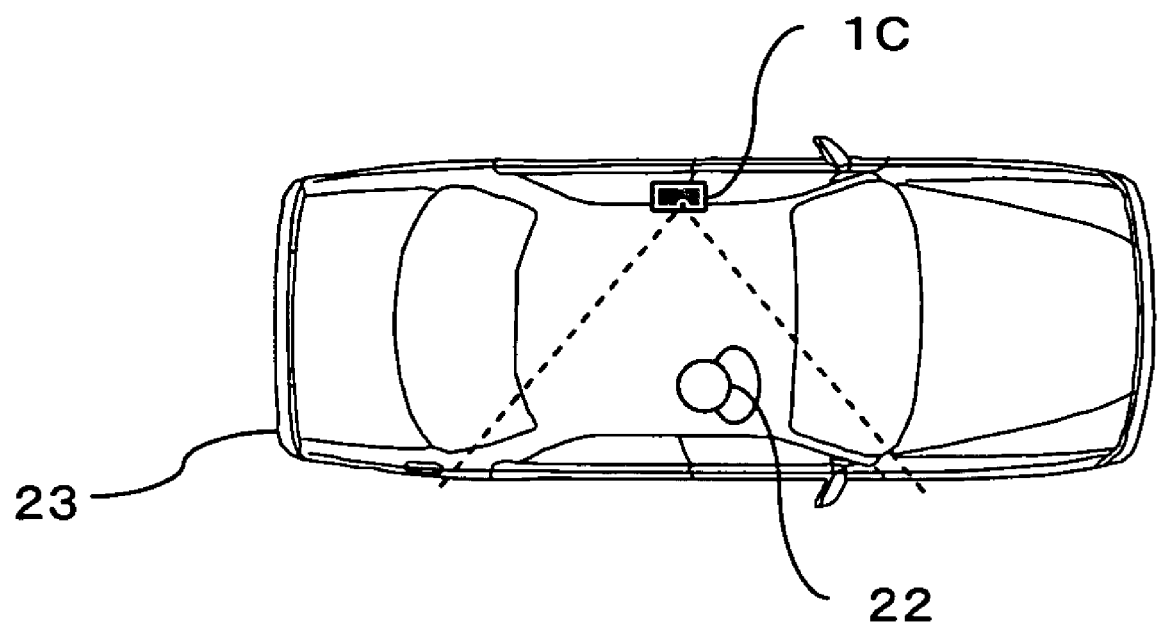
FIG. 21 presents an example in which the camera is installed at a side of the vehicle body.

While an explanation is given above in reference to the third through fifth embodiments on an example in which the front airbag deployment is controlled based upon the contact time, the same principle may be adopted in deployment control for a side airbag as well. FIG. 21 presents an example in which a camera 1C is installed at a side of the vehicle body so as to enable calculation of the length of time to elapse before the driver strikes the side of the vehicle body.

While the contact time calculation apparatus in the fourth embodiment calculates a plurality of lengths of time to elapse before contact by setting a plurality of reference points and a plurality of reference angles, a plurality of lengths of time to elapse before contact may also be calculated in conjunction with the contact time calculation apparatuses in the fifth and sixth embodiments by setting a plurality of reference points and a plurality of reference angles.

The disclosures of the following priority applications are herein incorporated by reference:

Japanese Patent Application No. 2005-025312 filed Feb. 1, 2005

Japanese Patent Application No. 2004-259893 filed Sep. 7, 2004

What is claimed is:

1. A contact time calculation apparatus, comprising:
an image-capturing device installed at a mobile body;
an evaluation point extraction device that extracts as evaluation points two arbitrary points belonging to a single object on an image captured by the image-capturing device;
a first calculation device that calculates an absolute value representing a difference between coordinate values of the two points having been extracted from the image by the evaluation point extraction device, which are taken in reference to an arbitrary coordinate axis set on the image;
a second calculation device that calculates a time differential value between at least two absolute values that are calculated from images captured at different times by the image-capturing device respectively, each of the absolute values representing the difference between the coordinate values of the two points calculated by the first calculation device; and
a contact time calculation device that calculates a contact time being a length of time to elapse before the object containing the two points extracted by the evaluation point extraction device contacts the mobile body based upon the absolute value representing the difference between the coordinate values of the two points calculated by the first calculation device and the time differential value of the absolute value representing the difference between the coordinate values of the two points, which is calculated by the second calculation device.

2. A contact time calculation apparatus according to claim 1, wherein:
the contact time calculation device calculates the contact time by dividing the absolute value representing the difference between the coordinate values of the two points calculated by the first calculation device by the time differential value of the absolute value representing the difference between the coordinate values of the two points calculated by the second calculation device.

3. A contact time calculation apparatus according to claim 1, further comprising:
a vanishing point detection device that detects a vanishing point in an image captured by the image-capturing device;
an optical flow calculation device that calculates optical flow values of coordinate values of evaluation candidate points that may be used as the evaluation points in reference to a coordinate axis with an origin point which is set at the vanishing point having been detected by the vanishing point detection device; and
an evaluation index value calculation device that calculates evaluation index values by dividing the coordinate values of the evaluation candidate points by the optical flow values calculated by the optical flow calculation device, wherein:
the evaluation point extraction device extracts the evaluation points based upon the evaluation index values having been calculated by the evaluation index value calculation device.

4. A contact time calculation apparatus according to claim 3, wherein:
the evaluation point extraction device extracts as the evaluation points two evaluation candidate points with equal evaluation index values having been calculated by the evaluation index value calculation device.

5. A contact time calculation apparatus according to claim 3, wherein:
the evaluation index value calculation device calculates the evaluation index values at least twice at different time points; and
the evaluation point extraction device extracts as the evaluation points two evaluation candidate points with evaluation reference values that are invariably equal to each other regardless of the timing with which the evaluation index values have been calculated.

6. A contact time calculation apparatus according to claim 3, further comprising:
a decision-making device that makes a decision as to whether or not the object containing the evaluation points is going to move across in front of the image-capturing device based upon the evaluation index values having been calculated by the evaluation index value calculation device and the contact time having been calculated by the contact time calculation device.

7. A contact time calculation apparatus according to claim 6, wherein:
the decision-making device judges the object containing the evaluation points to be moving across in front of the image-capturing device if either of the evaluation index values having been calculated by the evaluation index value calculation device for the two evaluation points is smaller than a value representing the contact time having been calculated by the contact time calculation device.

8. A contact time calculation apparatus according to claim 6, further comprising:
a warning device that issues a warning based upon the contact time calculated for the object containing the evaluation points, which is determined by the decision-making device to be an object that will move across in front of the image-capturing device.

9. An obstacle detection apparatus, comprising:
a contact time calculation apparatus according to claim 1; and
an obstacle detection device that detects an obstacle based upon the contact time having been calculated by the contact time calculation apparatus.

10. A contact time calculation apparatus according to claim 1, further comprising:
an area extraction device that extracts an arbitrary area on the image captured by the image-capturing device;
a setting device that sets a reference point and a reference axis inside the area having been extracted by the area extraction device; and
an area width ascertaining device that ascertains a length of a line passing through the reference point with a given inclination relative to the reference axis within the extracted area, the length being an area width of the extracted area, wherein:
the area width having been ascertained by the area width ascertaining device is used as an absolute value representing the difference between the coordinate values of the two points.

11. A contact time calculation apparatus according to claim 10, wherein:
the area width ascertaining device ascertains a first area width based upon an image captured at a first time point and ascertains a second area width based upon an image captured at a second time point with a predetermined time lag following the first time point, the second area width being a length of a line within the extracted area passing through the reference point with an angle of inclination having been set when ascertaining the first area width; and
the second calculation device calculates the time differential value of the absolute value representing the difference between the coordinate values of the two points based upon the first area width and the second area width having been ascertained at different time points by the area width ascertaining device.

12. A contact time calculation apparatus according to claim 10, wherein:
the area width ascertaining device ascertains a plurality of area widths of the extracted area, each of the area widths being a length of lines passing through the reference point with different angles formed relative to the reference axis; and
the contact time calculation device calculates a plurality of the contact times based upon the plurality of area widths having been ascertained by the area width ascertaining device and calculates the contact time by determining an average value of the plurality of the contact times having been calculated.

13. A contact time calculation apparatus according to claim 12, wherein:
the setting device sets a plurality of reference points inside the extracted area;
the area width ascertaining device ascertains area widths in correspondence to each of a plurality of reference points having been set within the extracted area by the setting device by lines passing through the reference points and extending inside the extracted area with different angles formed relative to the reference axis; and the contact time calculation device calculates a plurality of contact times in correspondence to the plurality of reference points based upon the plurality of area widths having been ascertained by the area width ascertaining device and calculates the contact time by determining an average value of the plurality of the contact times having been calculated.

14. A contact time calculation apparatus according to claim 12, wherein:

the contact time calculation device first eliminates at least either a largest value or a smallest value among the plurality of the contact times having been calculated based upon the plurality of area widths having been ascertained by the area width ascertaining device and then calculates the average value among the plurality of the contact times having been undergone elimination process.

15. A contact time calculation apparatus according to claim 10, further comprising:

a warning device that issues a warning based upon the contact time having been calculated by the contact time calculation device.

16. A contact time calculation apparatus according to claim 10, wherein:

the area extraction device extracts an area over which an occupant's face is photographed in the image captured by the image-capturing device;

the contact time calculation device calculates a length of time to elapse before the occupant strikes an object within a vehicle in the event of a vehicular collision; and the contact time calculation apparatus further includes an airbag deployment control device for controlling airbag deployment based upon the contact time having been calculated by the contact time calculation device.

17. A contact time calculation apparatus according to claim 16, wherein:

the airbag deployment control device implements control so as to allow an airbag to deploy faster when the contact time having been calculated by the contact time calculation device indicates a smaller value.

18. A contact time calculation apparatus according to claim 16, wherein:

the area extraction device extracts an area over which the occupant's face is photographed and an area over which an occupant's torso is photographed in the image captured by of the image-capturing device;

the contact time calculation device calculates the contact time corresponding to the occupant's torso as well as the contact time for an occupant's head in the event of a vehicular collision; and the airbag deployment control device controls the airbag deployment based upon the contact time calculated for the occupant's head and the contact time calculated for the occupant's torso.

19. A contact time calculation apparatus according to claim 10, further comprising:

a seat belt checking device that checks an extent to which a seat belt is tightened based upon the contact time having been calculated by the contact time calculation device; and a seat belt control device that controls retraction of the seat belt based upon the extent to which the seat belt is tightened, having been checked by the seat belt checking device, and the contact time having been calculated by the contact time calculation device.

20. A contact time calculation apparatus, comprising:

an image-capturing means for capturing an image installed at a mobile body;

an evaluation point extraction means for extracting as evaluation points two arbitrary points belonging to a single object on an image captured by the image-capturing means;

a first calculation means for calculating an absolute value representing a difference between coordinate values of the two points having been extracted from the image by the evaluation point extraction means, which are taken in reference to an arbitrary coordinate axis set on the image;

a second calculation means for calculating a time differential value between at least two absolute values that are calculated from images captured at different times by the image-capturing means respectively, each of the absolute values representing the difference between the coordinate values of the two points calculated by the first calculation means; and a contact time calculation means for calculating a contact time, the contact time being a length of time to elapse before the object containing the two points extracted by the evaluation point extraction means contacts the mobile body based upon the absolute value representing the difference between the coordinate values of the two points calculated by the first calculation means and the time differential value of the absolute value representing the difference between the coordinate values of the two points, which is calculated by the second calculation means.

21. An obstacle detection apparatus, comprising:

a contact time calculation apparatus according to claim 20; and an obstacle detection means for detecting an obstacle based upon the contact time having been calculated by the contact time calculation apparatus.

22. A contact time calculation method, comprising:

extracting as evaluation points two arbitrary points belonging to a single object on an image captured by an image-capturing device installed at a mobile body;

calculating an absolute value representing a difference between coordinate values of the two points having been extracted from the image, which are taken in reference to an arbitrary coordinate axis set on the image;

calculating a time differential value between at least two absolute values that are calculated from images captured at different times by the image-capturing device respectively, each of the absolute values representing the difference between the coordinate values of the two points; and calculating a contact time, the contact time being a length of time to elapse before the object containing the two points contacts the mobile body based upon the absolute value representing the difference between the coordinate values of the two points and the time differential value of the absolute value representing the difference between the coordinate values of the two points.

23. An obstacle detection method, comprising:

extracting as evaluation points two arbitrary points belonging to a single object on an image captured by an image-capturing device installed at a mobile body;

calculating an absolute value representing a difference between coordinate values of the two points having been extracted from the image, which are taken in reference to an arbitrary coordinate axis set on the image;

calculating a time differential value between at least two absolute values that are calculated from images captured at different times by the image-capturing device respectively, each of the absolute values representing the difference between the coordinate values of the two points;

calculating a contact time, the contact time being a length of time to elapse before the object containing the two points contacts the mobile body based upon the absolute value representing the difference between the coordinate values of the two points and the time differential value of the absolute value representing the difference between the coordinate values of the two points; and detecting an obstacle based upon the contact time having been calculated, wherein said obstacle detection method is implemented by a processor.

* * * * *